US012212156B2

(12) United States Patent
Peralta et al.

(10) Patent No.: US 12,212,156 B2
(45) Date of Patent: Jan. 28, 2025

(54) RECONFIGURABLE WIRELESS POWER TRANSMITTER FOR COMPUTER PERIPHERALS

(71) Applicant: NuCurrent, Inc., Chicago, IL (US)

(72) Inventors: Alberto Peralta, Chicago, IL (US); Md. Nazmul Alam, Glendale Heights, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 18/092,395

(22) Filed: Jan. 2, 2023

(65) Prior Publication Data

US 2023/0223793 A1 Jul. 13, 2023

Related U.S. Application Data

(63) Continuation of application No. 16/938,619, filed on Jul. 24, 2020, now Pat. No. 11,545,857.

(51) Int. Cl.
*H02J 50/50* (2016.01)
*H02J 50/12* (2016.01)
(Continued)

(52) U.S. Cl.
CPC ............ *H02J 50/502* (2020.01); *H02J 50/12* (2016.02); *H02J 50/27* (2016.02); *H02J 50/402* (2020.01)

(58) Field of Classification Search
CPC .......... H02J 50/502; H02J 50/12; H02J 50/27; H02J 50/402
See application file for complete search history.

(56) References Cited

U.S. PATENT DOCUMENTS 9,620,996 B2 4/2017 Zeine et al.
9,866,278 B2 1/2018 Lee et al.
(Continued)

FOREIGN PATENT DOCUMENTS

CN 109904936 A 6/2019
CN 107148658 B * 1/2020 .............. H02J 50/12
(Continued)

OTHER PUBLICATIONS

International Searching Authority, PCT International Search Report and Written Opinion, PCT International Application No. PCT/US2021/042766 dated Nov. 10, 2021, 9 pages.
(Continued)

*Primary Examiner* — Daniel Cavallari
(74) *Attorney, Agent, or Firm* — Lee Sullivan Shea & Smith LLP

(57) ABSTRACT

A reconfigurable wireless power transfer system includes a first wireless transmission system, one or more secondary wireless transmission systems, and at least one wireless receiver system. The first wireless transmission system is configured to receive input power from an input power source, generate wireless power signals, and couple with one or more other antennas. Each secondary wireless transmission systems is configured to couple with one or more of another secondary transmission antenna, the first transmission antenna, and/or one or more receiver antennas. The secondary wireless transmission systems receive the AC wireless signals from the first wireless transmission system and repeat the AC wireless signals to one or more secondary transmission antennas, receiver antennas, or combinations thereof. The one or more receiver antennas are configured to receive the AC wireless signals to provide electrical power to a load operatively associated with a computer peripheral.

10 Claims, 23 Drawing Sheets

(51) Int. Cl.
  *H02J 50/27* (2016.01)
  *H02J 50/40* (2016.01)

(56) References Cited

U.S. PATENT DOCUMENTS

| | | | |
|---|---|---|---|
| 10,651,670 | B1 | 5/2020 | Jiang et al. |
| 10,716,192 | B1 | 7/2020 | Tsibulevskiy |
| 2003/0030342 | A1 | 2/2003 | Chen et al. |
| 2007/0021140 | A1 | 1/2007 | Keyes, IV et al. |
| 2009/0015210 | A1 | 1/2009 | Kojima |
| 2009/0058189 | A1 | 3/2009 | Cook et al. |
| 2009/0212636 | A1 | 8/2009 | Cook et al. |
| 2009/0284245 | A1 | 11/2009 | Kirby et al. |
| 2011/0018498 | A1 | 1/2011 | Soar |
| 2011/0115430 | A1 | 5/2011 | Saunamaki |
| 2011/0175455 | A1 | 7/2011 | Hashiguchi |
| 2011/0304220 | A1 | 12/2011 | Whitehead |
| 2013/0062960 | A1 | 3/2013 | Rofe et al. |
| 2014/0035390 | A1 | 2/2014 | Bae et al. |
| 2014/0252875 | A1 | 9/2014 | Lee |
| 2015/0048790 | A1 | 2/2015 | Rudser et al. |
| 2015/0091496 | A1 | 4/2015 | Meunier et al. |
| 2015/0091502 | A1 | 4/2015 | Mukherjee et al. |
| 2015/0091508 | A1 | 4/2015 | Meunier et al. |
| 2015/0155737 | A1 | 6/2015 | Mayo |
| 2016/0006484 | A1 | 1/2016 | Swaans et al. |
| 2017/0040695 | A1 | 2/2017 | Rajagopalan et al. |
| 2017/0093202 | A1 | 3/2017 | Davila, Jr. et al. |
| 2017/0098959 | A1 | 4/2017 | Kikuchi et al. |
| 2017/0110914 | A1 | 4/2017 | Bell et al. |
| 2017/0120757 | A1 | 5/2017 | Lewis |
| 2017/0125161 | A1 | 5/2017 | Teggatz et al. |
| 2018/0034321 | A1 | 2/2018 | Tole et al. |
| 2018/0034327 | A1 | 2/2018 | Ren et al. |
| 2018/0048162 | A1 | 2/2018 | Von Novak et al. |
| 2018/0233957 | A1 | 8/2018 | Peralta et al. |
| 2018/0316391 | A1 | 11/2018 | Hijikata |
| 2019/0386512 | A1 | 12/2019 | Xiong |
| 2020/0110374 | A1 | 4/2020 | Piaskowski et al. |
| 2020/0112194 | A1 | 4/2020 | Cakmak |
| 2020/0227954 | A1 | 7/2020 | Ding et al. |
| 2020/0411990 | A1 | 12/2020 | Nakamura et al. |

FOREIGN PATENT DOCUMENTS

| | | | |
|---|---|---|---|
| JP | 2010284006 | A * | 12/2010 |
| JP | 2015146723 | A | 8/2015 |
| WO | 2017083676 | A1 | 5/2017 |
| WO | 2018035053 | A1 | 2/2018 |

OTHER PUBLICATIONS

International Searching Authority, PCT International Search Report and Written Opinion, PCT International Application No. PCT/US2022/046106 dated Feb. 3, 2023, 10 pages.

EP Application 21846270.3 , EP Extended Search Report, dated Jul. 5, 2024, 24 pages.

* cited by examiner

RECONFIGURABLE WIRELESS POWER TRANSMITTER FOR COMPUTER PERIPHERALS

CROSS-REFERENCE TO RELATED APPLICATIONS

This application is a continuation of, and claims priority to, U.S. Non-Provisional application Ser. No. 16/938,619, filed on Jul. 24, 2020, and entitled "RECONFIGURABLE WIRELESS POWER TRANSMITTER FOR COMPUTER PERIPHERALS," which is incorporated herein by reference in its entirety.

TECHNICAL FIELD

The present disclosure generally relates to systems and methods for wireless transfer of electrical power and/or electrical data signals, and, more particularly, to modular wireless power transmitters capable of repeating a power signal to wireless power receivers associated with computer peripherals.

BACKGROUND

Wireless connection systems are used in a variety of applications for the wireless transfer of electrical energy, electrical power, electromagnetic energy, electrical data signals, among other known wirelessly transmittable signals. Such systems often use inductive and/or resonant inductive wireless power transfer, which occurs when magnetic fields created by a transmitting element induce an electric field and, hence, an electric current, in a receiving element. These transmitting and receiving elements will often take the form of coiled wires and/or antennas.

Transmission of one or more of electrical energy, electrical power, electromagnetic energy and/or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

When such systems operate to wirelessly transfer power from a transmission system to a receiver system, via the coils and/or antennas, it is often desired to simultaneously or intermittently communicate electronic data from one system to the other. To that end, a variety of communications systems, methods, and/or apparatus have been utilized for combined wireless power and wireless data transfer. In some example systems, wireless power transfer related communications (e.g., validation procedures, electronic characteristics data communications, voltage data, current data, device type data, among other contemplated data communications) are performed using other circuitry, such as an optional Near Field Communications (NFC) antenna utilized to compliment the wireless power system and/or additional Bluetooth chipsets for data communications, among other known communications circuits and/or antennas.

However, using additional antennas and/or circuitry can give rise to several disadvantages. For instance, using additional antennas and/or circuitry can be inefficient and/or can increase the BOM of a wireless power system, which raises the cost for putting wireless power into an electronic device. Further, in some such systems, out of band communications provided by such additional antennas may result in interference, such as cross-talk between the antennas; such cross talk may present challenges in. Further yet, inclusion of such additional antennas and/or circuitry can result in worsened EMI, as introduction of the additional system will cause greater harmonic distortion, in comparison to a system wherein both a wireless power signal and a data signal are within the same channel. Still further, inclusion of additional antennas and/or circuitry hardware, for communications or increased charging or powering area, may increase the area within a device, for which the wireless power systems and/or components thereof reside, complicating a build of an end product.

SUMMARY

In some example applications for wireless power transfer, it is desired to power and/or charge multiple electronic devices, such as computer peripherals, simultaneously. Currently, systems and/or products exist, employing multiple transmitter coils and associated driver circuits, wherein each system couples with an individual receiving device. However, such systems are expensive, as the BOM is increased greatly for every additional system. Further, systems with multiple antennas and/or driving circuitry may be prone to interference, between one another, leading to potential inefficiencies and/or complications in communications capability or causing degradation to communications capabilities. Additionally, if a user were to desire to increase the charging and/or powering area of the transmitter, the user would be limited to the area provided by the original device or would be required to provide an additional wireless transmitter, having a separate connector to a power source.

Additionally, using the systems, methods, and apparatus disclosed herein may allow for greater variety in form factor selection and/or configuration. Thus, a designer and/or user may configure a powering area modularly, in manners that are nearly infinitely customizable, on either the design or consumer-user level. Such variety of form factor selection/configuration may include multiple antenna designs that provide a transmitting device with multiple "sub-areas" that either provide the benefit of a wider power transmission area or allow for multiple devices to be powered by a single transmission system.

To that end, modular wireless power transmitters, which are capable of repeating a wireless power signal to an associated, additional wireless power transmitter, are desired. Such systems may include communications systems and/or circuitry that provide stable and efficient in band communications, eliminating the aforementioned need for additional wireless data transmission antennas and/or circuitry. The systems and methods disclosed herein provide for a nearly unlimited combination of wireless power transmission areas, made possible by the inclusion of a plurality of modular wireless power transmitters in connection via use of the transmission antenna(s) as repeaters of the wireless power signal.

In addition to providing a greater charging area, utilizing multiple modular wireless power transmitters, as disclosed herein, may provide for further enhancement and/or fidelity of one or both of wireless power signals and/or wireless data signals, upon such signals' ultimate transmission to a receiver. While the transmitter connected wireless power transmitters may omit active elements in their signal path when coupled with, at least, the input source connected wireless power transmitter, the electronic signals will still travel through any tuning system(s) and/or inactive filters of the unsourced wireless power transmitters. Such exposure of the signal to additional filtering and/or tuning will further process the signal, in addition to the filtering/tuning performed by the input source connected wireless power transmitter. Thus, the additional filtering can increase fidelity of the electronic signals.

Additionally, the inclusion of multiple, repeater-connected wireless transmission systems, in separate modules, may allow for supply chain, retail stocking, and/or manufacturing benefits. As large and wide charging areas may be desired (to, for example, cover, in whole or in part, a desktop or tabletop), packaging and/or storing such a large sized wireless power transmission system may be burdensome to the supply chain, retail stocking, and/or manufacturing of such transmission systems. Therefore, by utilizing the modular wireless transmission systems disclosed herein, such burdens may be resolved, as the desired large wireless power transmission areas can be subdivided into the disclosed modular transmission systems, to be packaged, singularly or as a plurality, with far smaller surface areas than a packaged large area, non-modular transmitter. Additionally or alternatively, the modular wireless power transmission systems disclosed herein may be utilized, as sold separately from one another, to upgrade or expand a wireless transmission area of a surface, as the modularity allows for a user to acquire additional transmitters to expand the wirelessly powered space.

The communications systems of the wireless power transmitters disclosed herein is a relatively inexpensive and/or simplified circuit utilized to, at least partially, decode or demodulate ASK signals down to alerts for rising and falling edges of a data signal. So long as the transmission controller 28 is programmed to understand the coding schema of the ASK modulation, the transmission controller will expend far less computational resources than it would if it had to decode the leading and falling edges directly from an input current or voltage sense signal from the sensing system. To that end, as the computational resources required by the transmission controller to decode the wireless data signals are significantly decreased due to the inclusion of the demodulation circuit. Thus, it follows, that the demodulation circuit may significantly reduce BOM of the wireless transmission system, by allowing usage of cheaper, less computationally capable processor(s) for or with the transmission controller 28.

In some embodiments of the disclosure, the wireless transmission antenna is configured to generates a greater powering or charging area, with respect to legacy transmission antennas. Further, by utilizing the transmission antennas and the intelligent placement of the crossovers, the antenna may effectively function as multiple antennas capable of transmission to multiple receivers. Further, due to the spacing of the inner and outer turns, a more uniform charge envelope may be achieved, leading to greater spatial freedom for the receiver when placed relative to the transmission antenna. Thus, having a higher density of turns on the outer edges of the antenna may prevent dead spots or inconsistent coupling, when a receiver is positioned proximate to an outer edge of the wireless transmission system 120.

In accordance with one aspect of the disclosure, a reconfigurable wireless power transfer system is disclosed. The system includes a first wireless transmission system, one or more secondary wireless transmission systems, and at least one wireless receiver system. The first wireless transmission system is configured to receive input power from an input power source and generate AC wireless signals based, at least in part, on the input power, the AC wireless signals including wireless power signals and wireless data signals, the first wireless transmission system including a first transmission antenna configured to couple with one or more other antennas. Each of the one or more secondary wireless transmission systems includes a secondary transmission antenna, the secondary transmission antenna configured to couple with one or more of another secondary transmission antenna, the first transmission antenna, one or more receiver antennas, or combinations thereof. The one or more secondary wireless transmission systems are configured to receive the AC wireless signals from one or more of the first wireless transmission system, another secondary wireless transmission system, or combinations thereof and repeat the AC wireless signals to one or more of the secondary transmission antennas, the one or more receiver antennas, or combinations thereof. The at least one wireless receiver system is configured to receive the AC wireless signals to provide electrical power to a load operatively associated with the wireless receiver system, the wireless receiver system including one of the one or more receiver antennas, the one or more receiver antennas each configured to couple with one or more of the first wireless transmission system, the one or more secondary wireless transmission systems, or combinations thereof. The at least one wireless receiver system is operatively associated with a computer peripheral.

In a refinement, the computer peripheral includes one or more of a computer input device, a mouse, a keyboard, a tablet computer, a mobile device, an audio device, a headset, headphones, earbuds, a remote control, a recording device, a conference telephonic device, a microphone, a gaming controller, a camera, a stylus, electronic eyewear, or combinations thereof.

In a refinement, one or more of the first wireless transmission system, the one or more secondary wireless transmission systems, or combinations thereof are configured to directly power an electronic device operatively associated with the wireless receiver system.

In a refinement, one or more of the first wireless transmission system, the one or more secondary wireless transmission systems, or combinations thereof are configured to provide electrical power to a load of an electronic device operatively associated with the wireless receiver system, wherein the load is an electrical energy storage device.

In a refinement, the first wireless transmission system further includes a first transmission controller configured to provide first driving signals for driving the first transmission antenna, a first power conditioning system configured to receive the driving signals and generate the AC wireless signals based, at least in part, on the first driving signal. In such a refinement, a first power conditioning system configured to receive the driving signals and generate the AC wireless signals based, at least in part, on the first driving signal and a first power conditioning system configured to receive the driving signals and generate the AC wireless signals based, at least in part, on the first driving signal.

In a further refinement, when the at least one of the one or more secondary wireless transmission systems is configured to repeat the AC wireless signals, the second transmission controller and the second power conditioning system are bypassed in a signal path for the AC wireless signals.

In a refinement, the first wireless transmission system further includes a first transmission controller configured to provide first driving signals for driving the first transmission antenna, a first power conditioning system configured to receive the driving signals and generate the AC wireless signals based, at least in part, on the first driving signal, and a first transmission tuning system operatively associated with the first transmission antenna. In such a refinement, at least one of the one or more secondary wireless transmission systems further includes a second transmission tuning system operatively associated with the secondary transmission antenna.

In a further refinement, the first transmission tuning system is configured to filter the AC wireless signals to generate filtered AC wireless signals and the second transmission tuning system is configured to further filter the filtered AC wireless signals to generate twice-filtered AC wireless signals.

In a refinement, the system further includes a demodulation circuit configured to receive communications signals from a wireless receiver system and decode the communications signals by determining a rate of change in electrical characteristics of the communications signals.

In a refinement, the first wireless transmission system further includes a repeater tuning system configured to tune a portion of the first antenna to function as a repeater for the AC wireless signals.

In a refinement, at least one of the one or more secondary wireless transmission systems further includes a repeater tuning system configured to tune the secondary transmission antenna to function as a repeater for the AC wireless signals.

In a further refinement, the secondary transmission antenna includes a first antenna portion and a second antenna portion and the repeater tuning system is configured to tune the secondary transmission antenna such that the first antenna portion is configured to receive the AC wireless signals from the transmission antenna and one or more of the first antenna portion, the second antenna portion, or combinations thereof are configured to repeat the AC wireless signals.

In a refinement, each of the first transmission antenna and the second transmission antenna are configured to operate based on an operating frequency of about 6.78 MHz.

In accordance with another aspect of the disclosure, a reconfigurable wireless transmission system for transmitting AC wireless signals is disclosed. The AC wireless signals include wireless power signals and wireless data signals. The system includes a transmission controller, a power conditioning system, and a first transmission antenna. The transmission controller is configured to provide first driving signals for driving the first transmission antenna. The power conditioning system is configured to receive the driving signals, receive input power from an input power source, and generate the AC wireless signals based, at least in part, on the first driving signal and the input power source. The first transmission antenna is configured for coupling with one or more other antennas and is configured to transmit the AC wireless signals to the one or more antennas, receive the AC wireless signals from one or more other antennas, and repeat the AC wireless signals to the one or more other antennas.

In a refinement, the transmission antenna includes a first antenna portion and a second antenna portion, the second antenna portion is configured to receive the AC wireless signals from one or more other antennas.

In a further refinement, one or more of the first antenna portion, the second antenna portion, or combinations thereof are configured to repeat the AC wireless signals to the one or more other antennas.

In another further refinement, the system further includes a repeater tuning system configured to tune one or more portion of the transmission antenna to repeat the AC wireless signals.

In another further refinement, when the wireless transmission system is configured to repeat the AC wireless signals, the transmission controller and the power conditioning system are bypassed in a signal path for the AC wireless signals.

In a refinement, the first transmission antenna is configured to operate based on an operating frequency of about 6.78 MHz.

In accordance with one aspect of the disclosure, a reconfigurable wireless power transfer system is disclosed. The system is configured to operate based on an operating frequency of about 6.78 MHz. The system includes a first wireless transmission system, one or more secondary wireless transmission systems, and a wireless receiver system. The first wireless transmission system is configured to receive input power from an input power source and generate AC wireless signals based, at least in part, on the input power, the AC wireless signals including wireless power signals and wireless data signals, the first wireless transmission system including a first transmission antenna configured to couple with one or more other antennas and operate based on the operating frequency. Each of the one or more secondary wireless transmission systems includes a secondary transmission antenna, the secondary transmission antenna configured to couple with one or more of another secondary transmission antenna, the first transmission antenna, one or more receiver antennas, or combinations thereof. The one or more secondary wireless transmission systems are configured to operate based on the operating frequency, receive the AC wireless signals from one or more of the first wireless transmission system, another secondary wireless transmission system, or combinations thereof, and repeat the AC wireless signals to one or more of the secondary transmission antennas, the one or more receiver antennas, or combinations thereof. The wireless receiver system is configured to receive the AC wireless signals to provide electrical power to a load operatively associated with the wireless receiver system, the wireless receiver system including one of the one or more receiver antennas, the one or more receiver antennas each configured to couple with one or more of the first wireless transmission system, the one or more secondary wireless transmission systems, or combinations thereof. The load is operatively associated with a computer peripheral These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
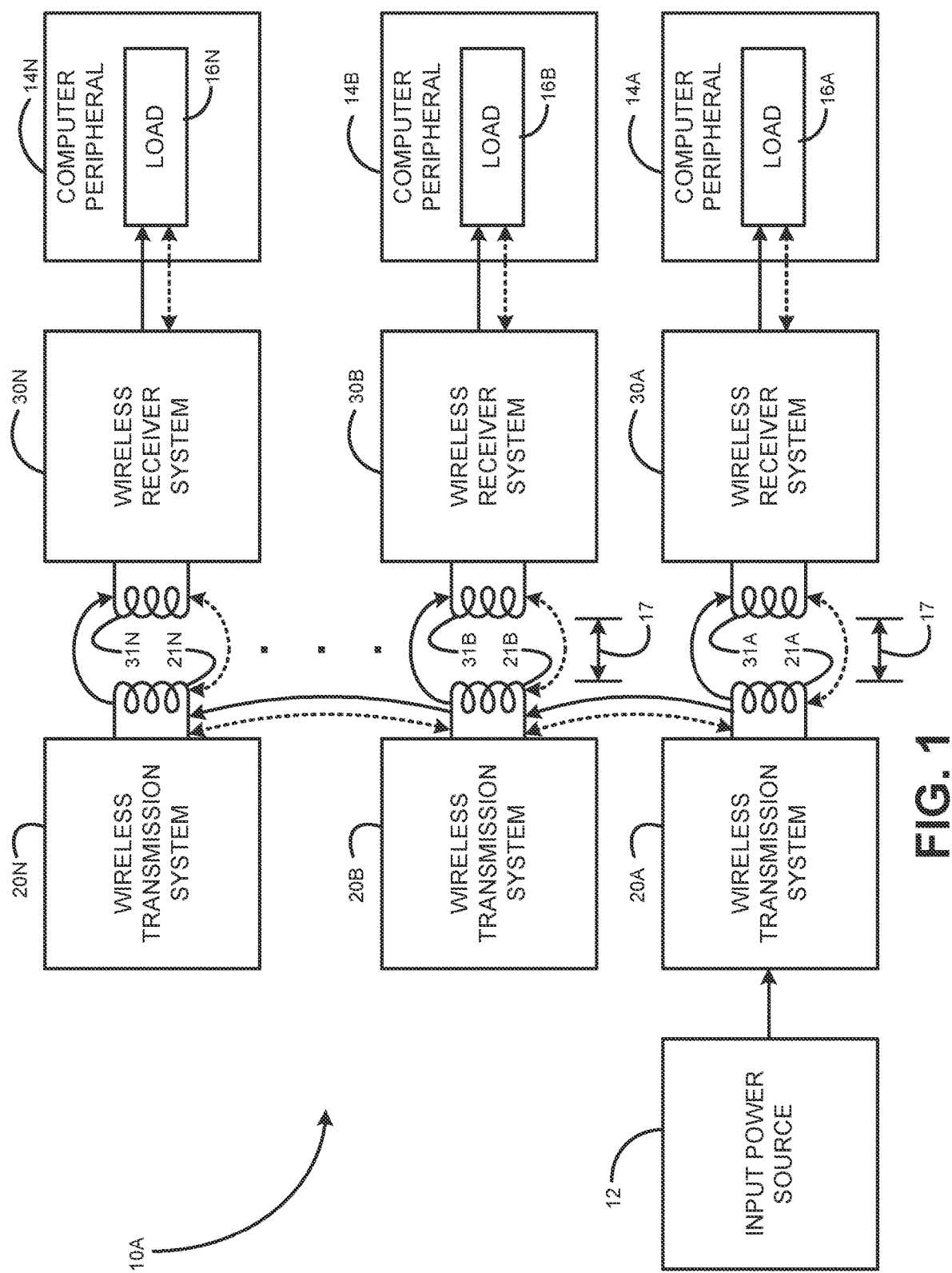
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes one or more wireless transmission systems 20 and one or more wireless receiver systems 30. A wireless receiver system 30 is configured to receive electrical signals from, at least, a wireless transmission system 20. As illustrated, the system 10 may include any number of wireless transmission systems 20, up to "N" number of wireless transmission systems 20N. Similarly, the system 10 may include any number of wireless receiver systems 30, up to "N" number of wireless receiver systems 30N.

As illustrated, the wireless transmission system(s) 20 and wireless receiver system(s) 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of two or more wireless transmission systems 20 and wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

As illustrated in FIG. 1, one or more transmission antennas 21 of the wireless transmission system(s) 20 may operate as a repeater of a wireless power signal. As defined herein, a "repeater" is an antenna that is configured to relay magnetic fields emanating between a transmission antenna 21 and one or both of a receiver antenna 31 and one or more other transmission antennas 21, when such subsequent transmission antennas 21 are configured as repeaters. Thus, the one or more transmission antennas 21 and/or systems 20 thereof may be configured to relay electrical energy and/or data via NMFC from the transmission antenna 21 to a receiver antenna 31 or to another transmission antenna 21. In one or more embodiments, such repeating transmission antennas 20B, 20N comprise an inductor coil capable of resonating at a frequency that is about the same as the resonating frequency of the transmission antenna 21 and the receiver antenna 31.

Figure 2A:
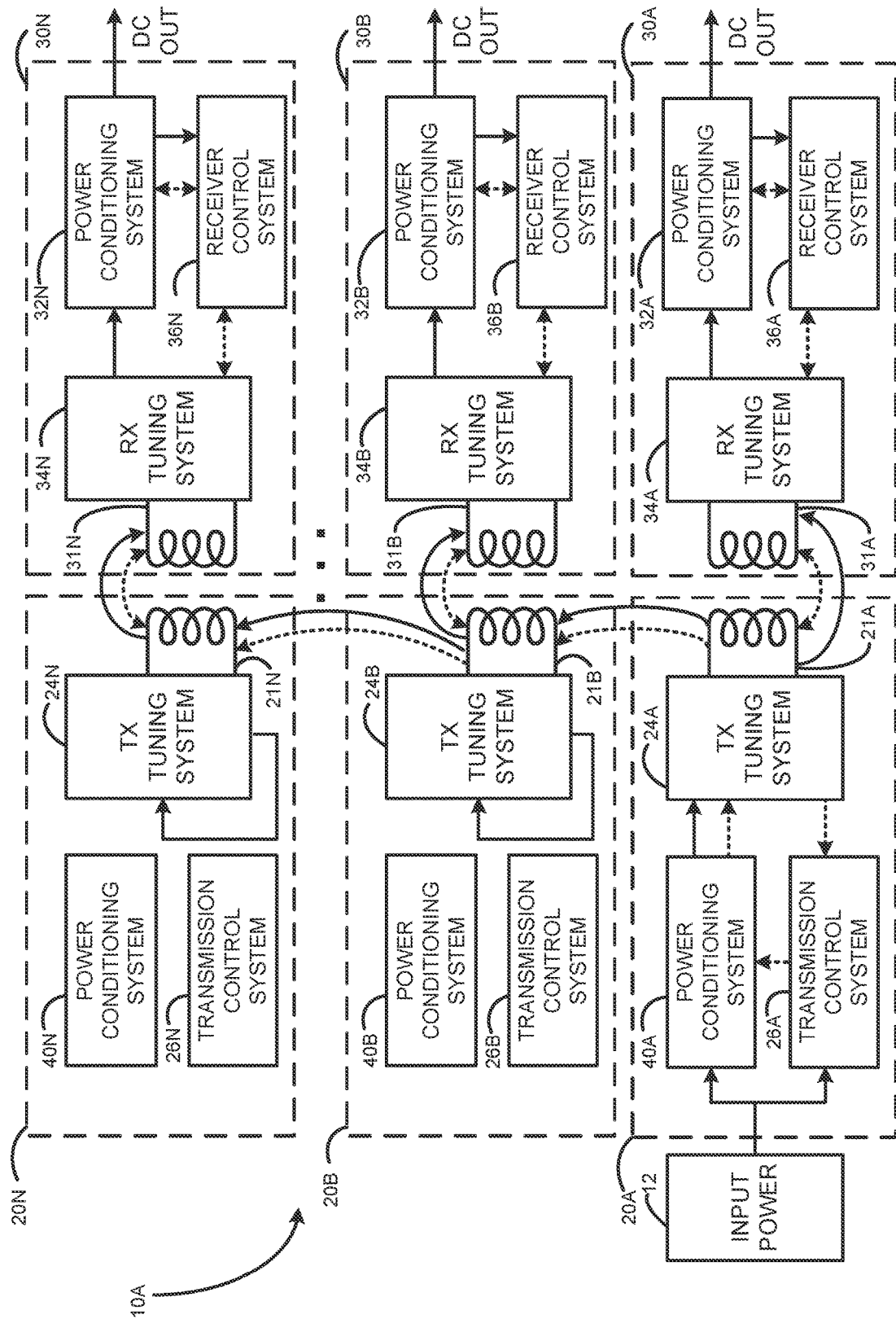
FIG. 2A is a block diagram illustrating components of a plurality of modular wireless transmission systems of the system of FIG. 1 and a plurality of wireless receiver systems of the system of FIG. 1, in accordance with FIG. 1 and the present disclosure.
Figure 2B:
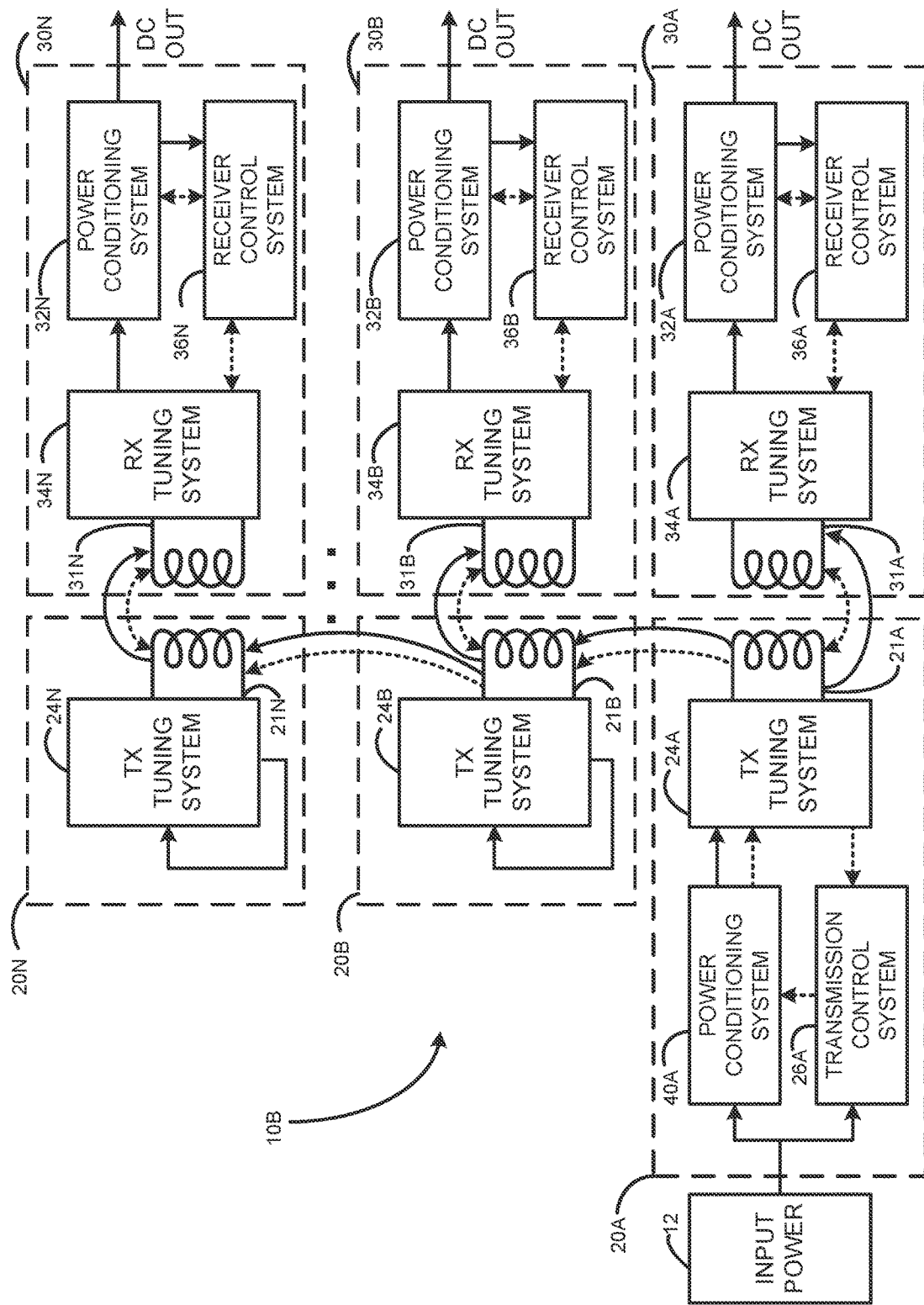
FIG. 2B is another block diagram illustrating components of a plurality of modular wireless transmission systems of the system of FIG. 1 and a plurality of wireless receiver systems of the system of FIG. 1, in accordance with FIG. 1 and the present disclosure.

Further, while FIGS. 1-2B may depict wireless power signals and wireless data signals transferring only from one antenna (e.g., a transmission antenna 21) to another antenna (e.g., a receiver antenna 31 and/or a transmission antenna 21), it is certainly possible that a transmitting antenna 21 may transfer electrical signals and/or couple with one or more other antennas and transfer, at least in part, components of the output signals or magnetic fields of the transmitting antenna 21. Such transmission may include secondary and/or stray coupling or signal transfer to multiple antennas of the system 10.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, at least one wireless transmission system 20A is associated with an input power source 12. The input power source 12 may be operatively associated with a host device, which may be any electrically operated device, circuit board, electronic assembly, dedicated charging device, or any other contemplated electronic device.

Example host devices, with which the wireless transmission system 20A may be associated therewith, include, but are not limited to including, a device that includes an integrated circuit, a portable computing device, storage medium for electronic devices, charging apparatus for one or multiple electronic devices, dedicated electrical charging devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

In FIG. 1, the only wireless transmission system 20 that is physically in electrical connection with the input power source 12 is the first wireless transmission system 20A. A wireless transmission system 20 that is in physical electrical connection with the input power source 12, for the purposes of this disclosure, is referred to as a "input source connected wireless power transmitter." The additional wireless power transmission systems 20B, 20N both are capable of repeating and transmitting wireless signals and may include like or identical components to those of the input source connected wireless power transmitter 20A; however, the systems 20B, 20N are not in physical electrical connection with the input power source 12 and repeat wireless power signals and wireless data signals from one or more of the input source connected wireless power transmitter 20A, another transmitter connected wireless power transmitter 20B, 20N, or combinations thereof. A wireless transmission system 20 that is not in physical electrical connection with the input power source 12, for the purposes of this disclosure, is referred to as a "transmitter connected wireless power transmitter."

Electrical energy received by the wireless transmission system(s) 20 is then used for at least two purposes: to provide electrical power to internal components of the wireless transmission system 20 and to provide electrical power to the transmission antenna 21. The transmission antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmission antenna 21 and one or more of receiving antenna 31 of, or associated with, the wireless receiver system 30, another transmission antenna 21, or combinations thereof. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmission antenna 21 or the receiver antenna 31 are strategically positioned to facilitate reception and/or transmission of wirelessly transferred electrical signals through near field magnetic induction. Antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one computer peripheral 14, wherein the computer peripheral 14 may be any device providing input and/or output to a computing device, that requires electrical power for any function and/or for power storage (e.g., via a battery and/or capacitor). Additionally, the computer peripheral 14 may be any computer peripheral capable of receipt of electronically transmissible data. For example, the computer peripheral 14 may be, but is not limited to being, a computer input device, a mouse, a keyboard, an audio device, a headset, headphones, earbuds, a recording device, a conference telephonic device, a microphone, an electronic stylus, a handheld computing device, a mobile device, an electronic tool, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Turning now to FIG. 2, the wireless power transfer system 10 is illustrated as a block diagram including example sub-systems of both the wireless transmission systems 20 and the wireless receiver systems 30. The wireless transmission systems 20 may include, at least, a power conditioning system 40, a transmission control system 26, a transmission tuning system 24, and the transmission antenna 21. A first portion of the electrical energy input from the input power source 12 may be configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

In some examples including transmitter connected wireless transmission systems 20B, 20N, active or externally powered components of the wireless transmission system 20 may be shorted or bypassed, when the electrical signals pass through circuitry of the transmitter connected wireless transmission systems 20B, 20N. Such shorting or bypassing of the active electronics may be achieved when the transmission antennas 21B, 12N are properly impedance matched for repeating the wireless signals. Such signal travel through, for example, the transmission tuning systems 20B, 20N may provide for greater filtering and/or signal fidelity, as another instance of filtering and/or tuning is provided to the travelling signal, prior to transmission by the transmission antennas 21B, 21N. As illustrated best in the system of FIG. 2B, some example transmitter connected wireless transmission systems 20B, 20N may omit one or more of the active circuits and/or active circuit components of the wireless transmission system 20A.

"Active components," as defined herein, refer to components of the wireless transmission system(s) 20 that require an input power (e.g., from an input power source 12) to perform their intended functions within the wireless transmission system(s) 20 and/or any sub-components thereof. Active components include, but are not limited to including, processors, controllers, amplifiers, transistors, or combinations thereof, among other active components known to those having skill in the art. "Passive components," as defined herein, refer to components of the wireless transmission system(s) 20 that perform their intended functions, within the wireless transmission system(s) 20 and/or any sub-components thereof, whether or not the passive components are in a signal path of an input power source. Example passive components include, but are not limited to including, resistors, capacitors, inductors, diodes, transformers, or combinations thereof, among other passive components known to those having skill in the art.

By omitting the active components in the signal path, modular, additional transmitter connected wireless transmission systems 20 may be provided to a user at lower cost than an input source connected wireless transmission system 20A. Thus, if the user desires to increase the charging area for the electronic device(s) 14, transmitter connected wireless transmission systems 20 may be provided at a lower cost, due to the omission of active components that would otherwise be necessary if the system 20 was drawing power from an input power source. Additionally, by omitting the active components from the signal path, transmission of the wireless signals, via the wireless transmission system 10 including one or more transmission systems 20B, 20N configured as repeating systems, power or efficiency losses caused by the active components may be removed from the signal transfer.

The term "modular," as defined herein, is an adjective referring to systems that may be constructed utilizing standardized units or components, such that user flexibility and/or reconfigurability with such standardized units or components allows for a variety uses or permutations of the system.

Additionally or alternatively, the wireless transmission systems disclosed herein may be reconfigurable. A "reconfigurable" wireless power transfer or transmission system, as defined herein, refers to a wireless power transfer or transmission system having a plurality of secondary transmission systems (e.g., the wireless transmission systems 20B, 20N) capable of being moved relative to a primary transmission system (e.g., the wireless transmission system 20A), while, during such movement, the secondary transmission system (s) are still capable of receiving wireless power signals from the primary transmission system. A primary transmission system, as defined herein, refers to a powered and/or "active" wireless power transmission system receiving electrical energy or power directly from an input power source, which conditions the electrical energy or power for wireless transmission. The primary transmission system generates a primary or active powering/charging zone proximate to the primary transmission system. A secondary transmission system, as defined herein, refers to a wirelessly powered or "passive" wireless transmission system configured to receive wireless power signals from a primary transmission system and transmit or repeat the wireless power signals to one or more of additional secondary transmission systems, wireless receiver systems, or combinations thereof. Secondary wireless transmission systems generate a secondary or passive powering/charging zone proximate to the secondary wireless transmission system(s).

Figure 3:
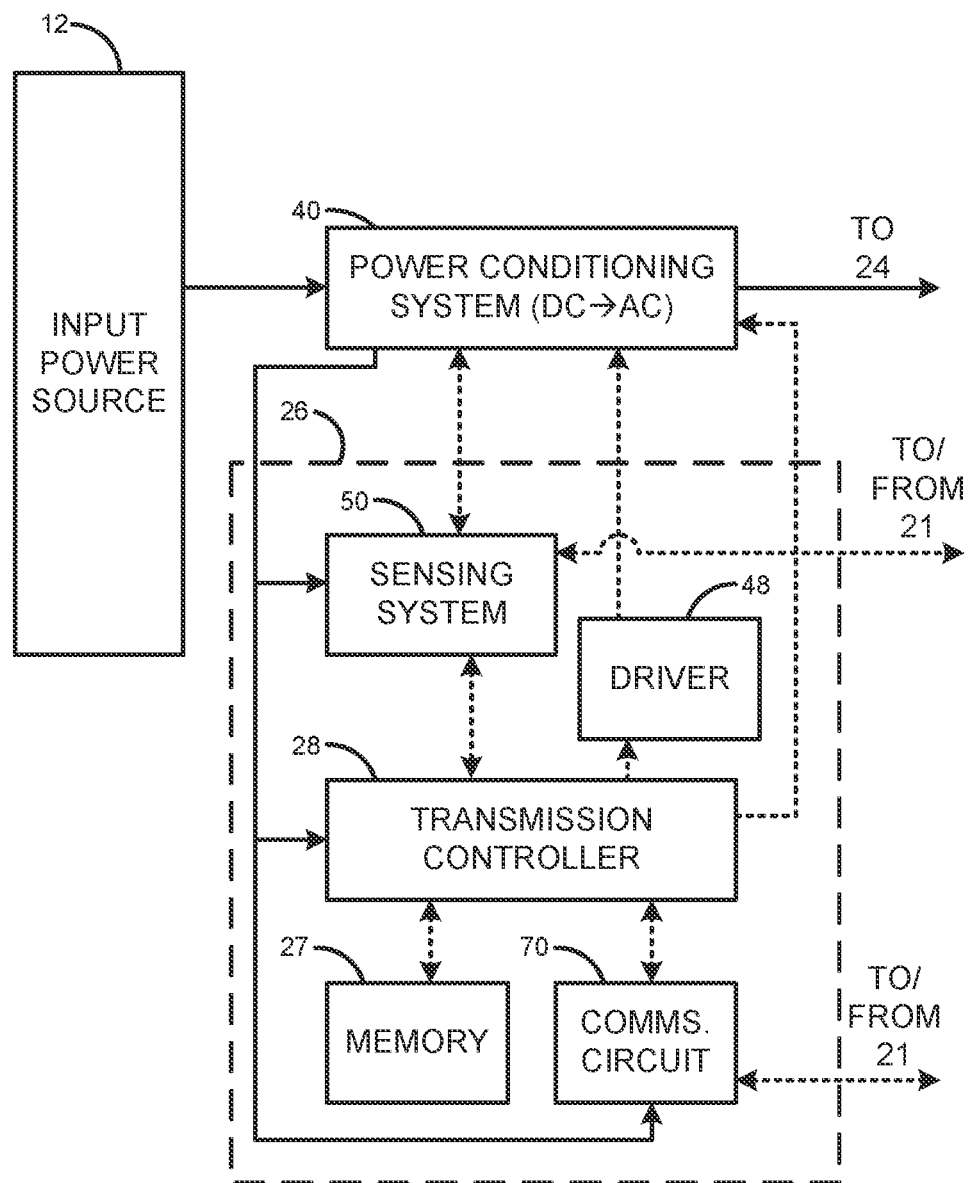
FIG. 3 is a block diagram illustrating components of a transmission control system of the wireless transmission system of FIGS. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
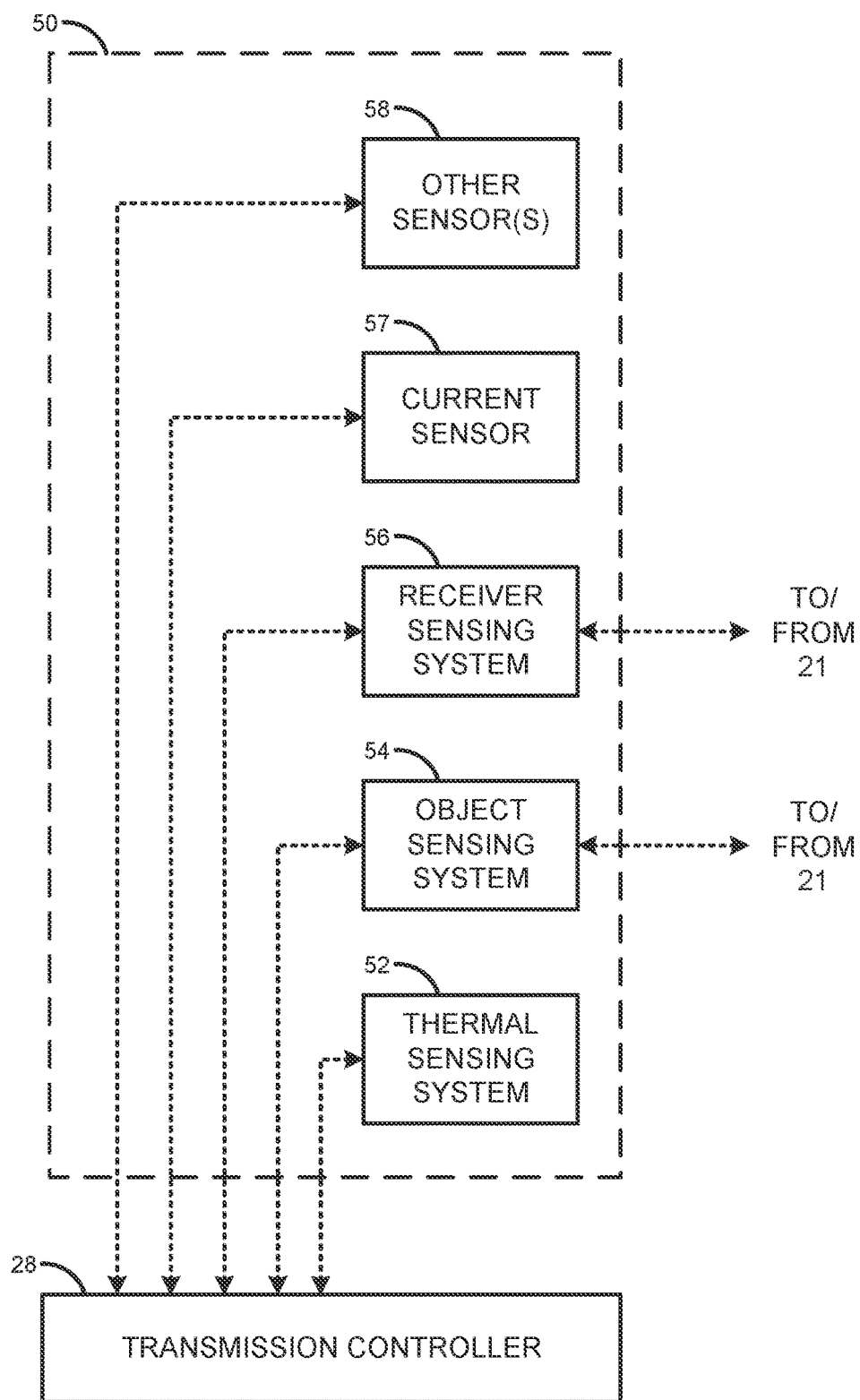
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, a current sensor 57, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56, the current sensor 57, and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 200 Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof. In some examples, the quality factor measurements, described above, may be performed when the wireless power transfer system 10 is performing in band communications.

The receiver sensing system 56 is any sensor, circuit, and/or combinations thereof configured to detect presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
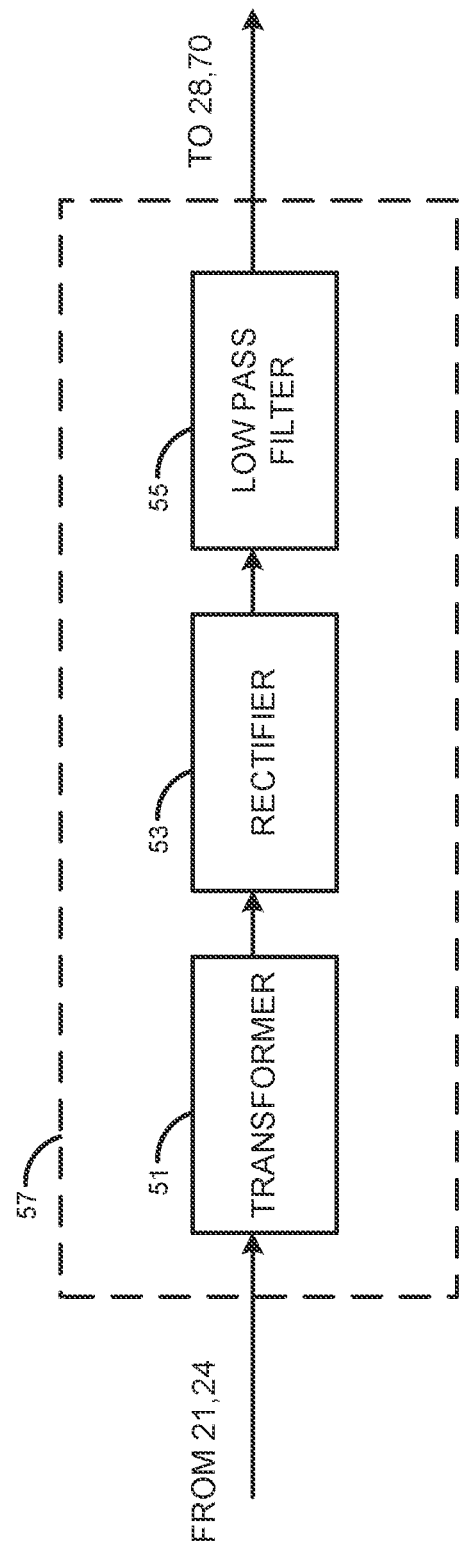
FIG. 5 is a block diagram for an example low pass filter of the sensing system of FIG. 4, in accordance with FIGS. 1-4 and the present disclosure.

The current sensor 57 may be any sensor configured to determine electrical information from an electrical signal, such as a voltage or a current, based on a current reading at the current sensor 57. Components of an example current sensor 57 are further illustrated in FIG. 5, which is a block diagram for the current sensor 57. The current sensor 57 may include a transformer 51, a rectifier 53, and/or a low pass filter 55, to process the AC wireless signals, transferred via coupling between the wireless receiver system(s) 20 and wireless transmission system(s) 30, to determine or provide information to derive a current ($I_{Tx}$) or voltage ($V_{Tx}$) at the transmission antenna 21. The transformer 51 may receive the AC wireless signals and either step up or step down the voltage of the AC wireless signal, such that it can properly be processed by the current sensor. The rectifier 53 may receive the transformed AC wireless signal and rectify the signal, such that any negative remaining in the transformed AC wireless signal are either eliminated or converted to opposite positive voltages, to generate a rectified AC wireless signal. The low pass filter 55 is configured to receive the rectified AC wireless signal and filter out AC components (e.g., the operating or carrier frequency of the AC wireless signal) of the rectified AC wireless signal, such that a DC voltage is output for the current ($I_{Tx}$) and/or voltage ($V_{Tx}$) at the transmission antenna 21.

Figure 6:
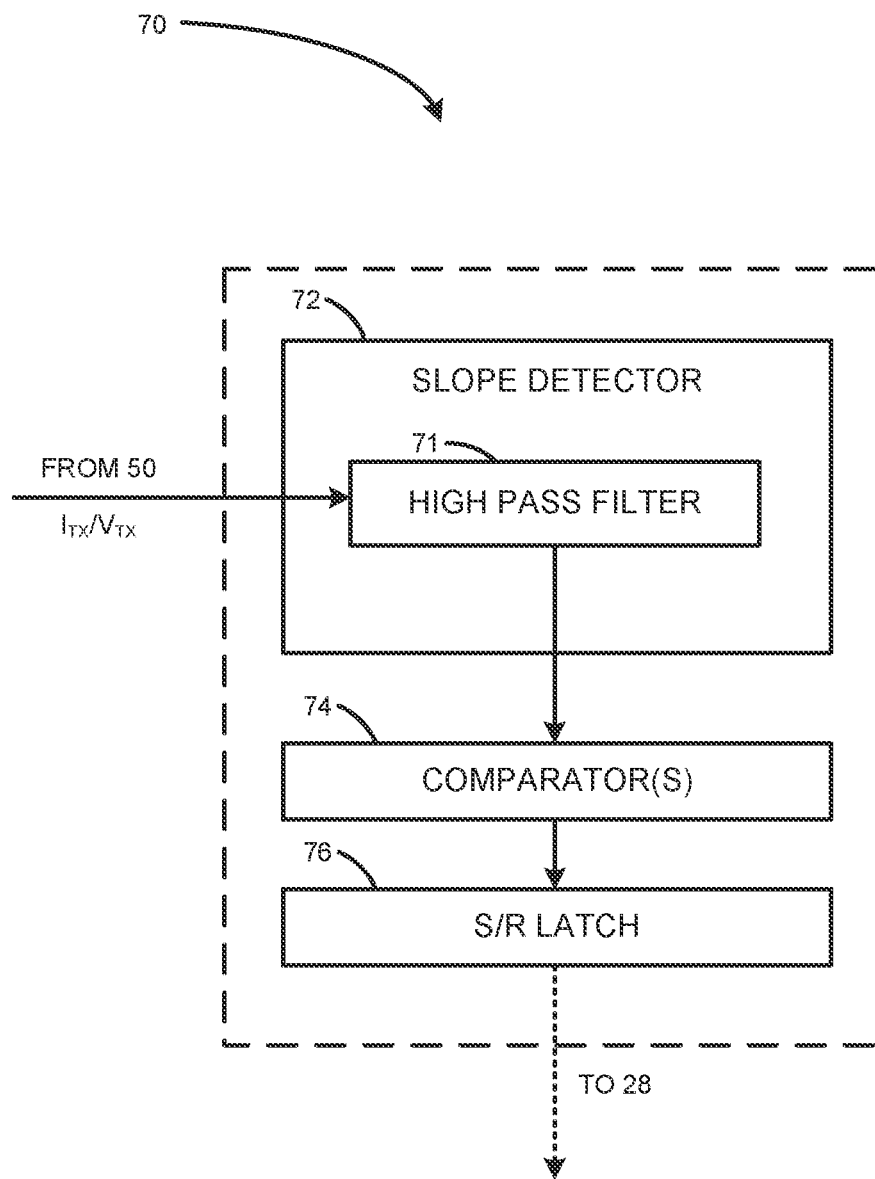
FIG. 6 is a block diagram illustrating components of a demodulation circuit for the wireless transmission system of FIGS. 2, in accordance with FIGS. 1-4 and the present disclosure.

FIG. 6 is a block diagram for a demodulation circuit 70 for the wireless transmission system(s) 20, which is used by the wireless transmission system 20 to simplify or decode components of wireless data signals of an alternating current (AC) wireless signal, prior to transmission of the wireless data signal to the transmission controller 28. The demodulation circuit includes, at least, a slope detector 72 and a comparator 74. In some examples, the demodulation circuit 70 includes a set/reset (SR) latch 76. In some examples, the demodulation circuit 70 may be an analog circuit comprised of one or more passive components (e.g., resistors, capacitors, inductors, diodes, among other passive components) and/or one or more active components (e.g., operational amplifiers, logic gates, among other active components). Alternatively, it is contemplated that the demodulation circuit 70 and some or all of its components may be implemented as an integrated circuit (IC). In either an analog circuit or IC, it is contemplated that the demodulation circuit may be external of the transmission controller 28 and is configured to provide information associated with wireless data signals transmitted from the wireless receiver system 30 to the wireless transmission system 20.

The demodulation circuit 70 is configured to receive electrical information (e.g., $I_{Tx}$, $V_{Tx}$) from at least one sensor (e.g., a sensor of the sensing system 50), detect a change in such electrical information, determine if the change in the electrical information meets or exceeds one of a rise threshold or a fall threshold. If the change exceeds one of the rise threshold or the fall threshold, the demodulation circuit 70 generates an alert, and, output a plurality of data alerts. Such data alerts are received by the transmitter controller 28 and decoded by the transmitter controller 28 to determine the wireless data signals. In other words, the demodulation circuit 70 is configured to monitor the slope of an electrical signal (e.g., slope of a voltage at the power conditioning system 32 of a wireless receiver system 30) and output an alert if said slope exceeds a maximum slope threshold or undershoots a minimum slope threshold.

Such slope monitoring and/or slope detection by the communications system 70 is particularly useful when detecting or decoding an amplitude shift keying (ASK) signal that encodes the wireless data signals in-band of the wireless power signal at the operating frequency. In an ASK signal, the wireless data signals are encoded by damping the voltage of the magnetic field between the wireless transmission system 20 and the wireless receiver system 30. Such damping and subsequent re-rising of the voltage in the field is performed based on an encoding scheme for the wireless data signals (e.g., binary coding, Manchester coding, pulse-width modulated coding, among other known or novel coding systems and methods). The receiver of the wireless data signals (e.g., the wireless transmission system 20) must then detect rising and falling edges of the voltage of the field and decode said rising and falling edges to receive the wireless data signals.

While in a theoretical, ideal scenario, an ASK signal will rise and fall instantaneously, with no slope between the high voltage and the low voltage for ASK modulation; however, in physical reality, there is some time that passes when the ASK signal transitions from the "high" voltage to the "low" voltage. Thus, the voltage or current signal sensed by the demodulation circuit 70 will have some, knowable slope or rate of change in voltage when transitioning from the high ASK voltage to the low ASK voltage. By configuring the demodulation circuit 70 to determine when said slope meets, overshoots and/or undershoots such rise and fall thresholds, known for the slope when operating in the system 10, the demodulation circuit can accurately detect rising and falling edges of the ASK signal.

Thus, a relatively inexpensive and/or simplified circuit may be utilized to, at least partially, decode ASK signals down to alerts for rising and falling instances. So long as the transmission controller 28 is programmed to understand the coding schema of the ASK modulation, the transmission controller 28 will expend far less computational resources than it would if it had to decode the leading and falling edges directly from an input current or voltage sense signal from the sensing system 50. To that end, as the computational resources required by the transmission controller 28 to decode the wireless data signals are significantly decreased due to the inclusion of the demodulation circuit 70, the demodulation circuit 70 may significantly reduce BOM of the wireless transmission system 20, by allowing usage of cheaper, less computationally capable processor(s) for or with the transmission controller 28.

The demodulation circuit 70 may be particularly useful in reducing the computational burden for decoding data signals, at the transmitter controller 28, when the ASK wireless data signals are encoded/decoded utilizing a pulse-width encoded ASK signals, in-band of the wireless power signals. A pulse-width encoded ASK signal refers to a signal wherein the data is encoded as a percentage of a period of a signal. For example, a two-bit pulse width encoded signal may encode a start bit as 20% of a period between high edges of the signal, encode "1" as 40% of a period between high edges of the signal, and encode "0" as 60% of a period between high edges of the signal, to generate a binary encoding format in the pulse width encoding scheme. Thus, as the pulse width encoding relies solely on monitoring rising and falling edges of the ASK signal, the periods between rising times need not be constant and the data signals may be asynchronous or "unclocked." Examples of pulse width encoding and systems and methods to perform such pulse width encoding are explained in greater detail in U.S. patent application Ser. No. 16/735,342 titled "Systems and Methods for Wireless Power Transfer Including Pulse Width Encoded Data Communications," to Michael Katz, which is commonly owned by the owner of the instant application and is hereby incorporated by reference.

Figure 7:
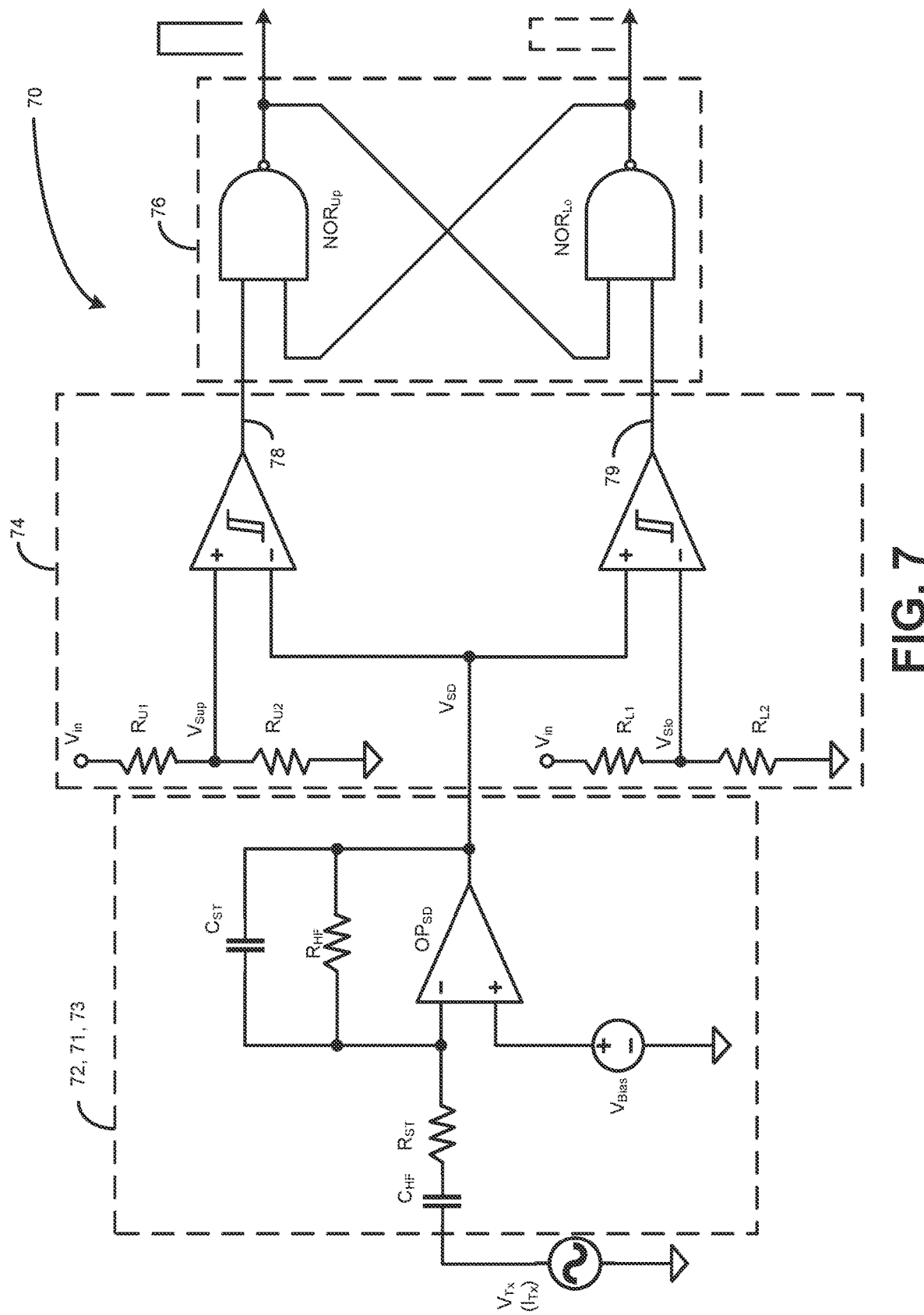
FIG. 7 is an electrical schematic diagram for the demodulation circuit of FIG. 6, in accordance with FIGS. 1-6 and the present disclosure.
Figure 8:
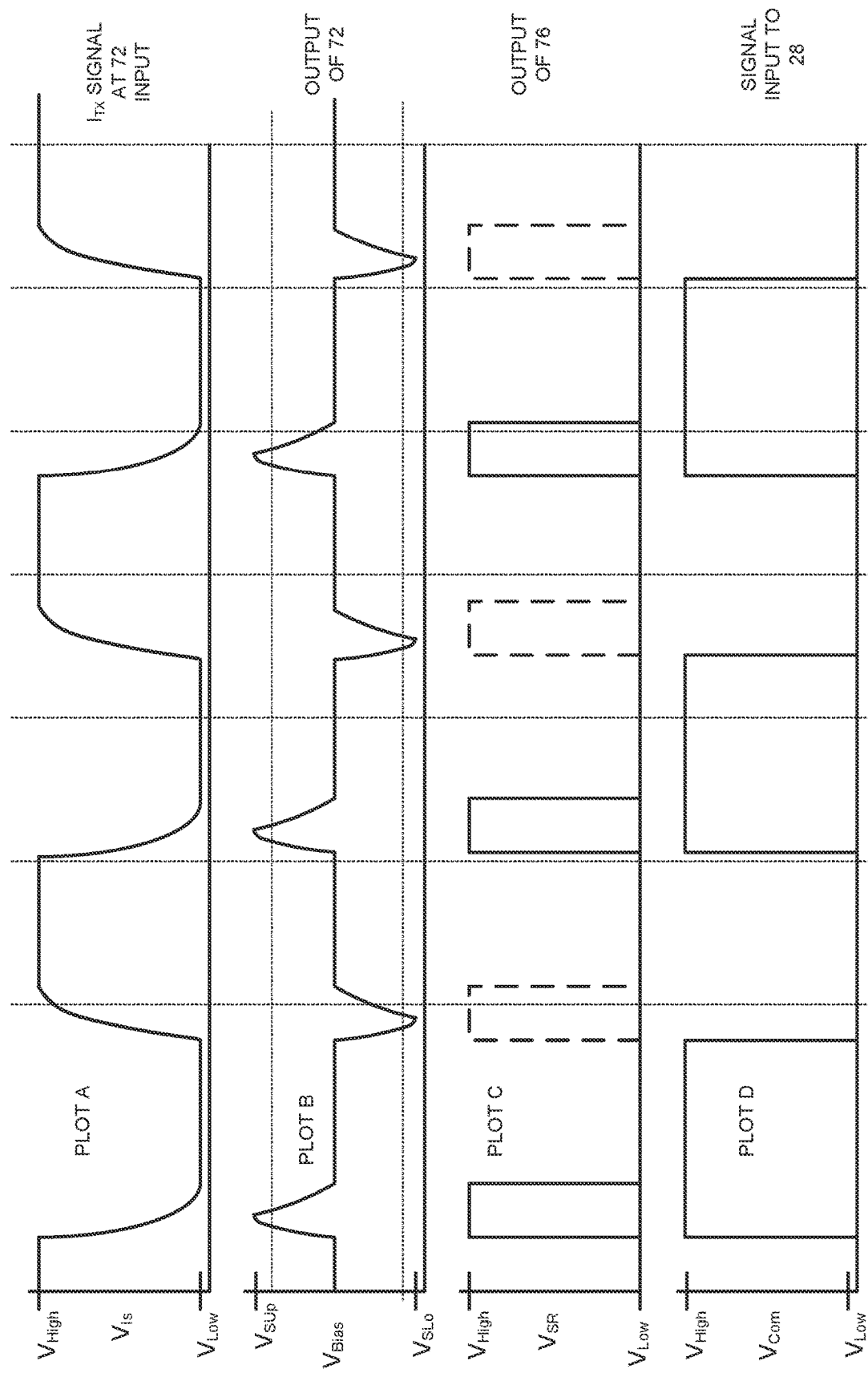
FIG. 8 is a timing diagram for voltages of an electrical signal, as it travels through the demodulation circuit, in accordance with FIGS. 1-7 and the present disclosure.

Turning now to FIG. 7, with continued reference to FIG. 6, an electrical schematic diagram for the demodulation circuit 70 is illustrated. Additionally, reference will be made to FIG. 8, which is an exemplary timing diagram illustrating signal shape or waveform at various stages or sub-circuits of the demodulation circuit 70. The input signal to the demodulation circuit 70 is illustrated in FIG. 7 as Plot A, showing rising and falling edges from a "high" voltage ($V_{High}$) on the transmission antenna 21 to a "low" voltage ($V_{Low}$) on the transmission antenna 21. The voltage signal of Plot A may be derived from, for example, a current ($I_{Tx}$) sensed at the transmission antenna 21 by one or more sensors of the sensing system 50. Such rises and falls from $V_{High}$ to $V_{Low}$ may be caused by load modulation, performed at the wireless receiver system(s) 30, to modulate the wireless power signals to include the wireless data signals via ASK modulation. As illustrated, the voltage of Plot A does not cleanly rise and fall when the ASK modulation is performed; rather, a slope or slopes, indicating rate(s) of change, occur during the transitions from $V_{High}$ to $V_{Low}$ and vice versa.

As illustrated in FIG. 7, the slope detector 72 includes a high pass filter 71, an operation amplifier (OpAmp) $OP_{SD}$, and an optional stabilizing circuit 73. The high pass filter 71 is configured to monitor for higher frequency components of the AC wireless signals and may include, at least, a filter capacitor ($CH_F$) and a filter resistor ($R_{HF}$). The values for $C_{HF}$ and $R_{HF}$ are selected and/or tuned for a desired cutoff frequency for the high pass filter 71. In some examples, the cutoff frequency for the high pass filter 71 may be selected as a value greater than or equal to about 1-2 kHz, to ensure adequately fast slope detection by the slope detector 72, when the operating frequency of the system 10 is on the order of MHz (e.g., an operating frequency of about 6.78 MHz). In some examples, the high pass filter 71 is configured such that harmonic components of the detected slope are unfiltered. In view of the current sensor 57 of FIG. 5, the high pass filter 71 and the low pass filter 55, in combination, may function as a bandpass filter for the demodulation circuit 70.

$OP_{SD}$ is any operational amplifier having an adequate bandwidth for proper signal response, for outputting the slope of $V_{Tx}$, but low enough to attenuate components of the signal that are based on the operating frequency and/or harmonics of the operating frequency. Additionally or alternatively, $OP_{SD}$ may be selected to have a small input voltage range for $V_{Tx}$, such that $OP_{SD}$ may avoid unnecessary error or clipping during large changes in voltage at $V_{Tx}$. Further, an input bias voltage ($V_{Bias}$) for $OP_{SD}$ may be selected based on values that ensure $OP_{SD}$ will not saturate under boundary conditions (e.g., steepest slopes, largest changes in $V_{Tx}$). It is to be noted, and is illustrated in Plot B of FIG. 8, that when no slope is detected, the output of the slope detector 72 will be $V_{Bias}$.

As the passive components of the slope detector 72 will set the terminals and zeroes for a transfer function of the slope detector 72, such passive components must be selected to ensure stability. To that end, if the desired and/or available components selected for $C_{HF}$ and $R_{HF}$ do not adequately set the terminals and zeros for the transfer function, additional, optional stability capacitor(s) $C_{ST}$ may be placed in parallel with $R_{HF}$ and stability resistor $R_{ST}$ may be placed in the input path to $OP_{SD}$.

Output of the slope detector 72 (Plot B representing $V_{SD}$) may approximate the following equation:

$$V_{SD} = -R_{HF}C_{HF}\frac{dV}{dt} + V_{Bias}$$

Thus, $V_{SD}$ will approximate to $V_{Bias}$, when no change in voltage (slope) is detected, and $V_{SD}$ will output the change in voltage (dV/dt), as scaled by the high pass filter 71, when $V_{Tx}$ rises and falls between the high voltage and the low voltage of the ASK modulation. The output of the slope detector 72, as illustrated in Plot B, may be a pulse, showing slope of $V_{Tx}$ rise and fall.

$V_{SD}$ is output to the comparator circuit(s) 74, which is configured to receive $V_{SD}$, compare $V_{SD}$ to a rising rate of change for the voltage ($V_{SUp}$) and a falling rate of change for the voltage ($V_{SLo}$). If $V_{SD}$ exceeds or meets $V_{SUp}$, then the comparator circuit will determine that the change in $V_{Tx}$ meets the rise threshold and indicates a rising edge in the ASK modulation. If $V_{SD}$ goes below or meets $V_{SLow}$, then the comparator circuit will determine that the change in $V_{Tx}$ meets the fall threshold and indicates a falling edge of the ASK modulation. It is to be noted that $V_{SUp}$ and $V_{SLo}$ may be selected to ensure a symmetrical triggering.

In some examples, such as the comparator circuit 74 illustrated in FIG. 6, the comparator circuit 74 may comprise a window comparator circuit. In such examples, the $V_{SUp}$ and $V_{SLo}$ may be set as a fraction of the power supply determined by resistor values of the comparator circuit 74. In some such examples, resistor values in the comparator circuit may be configured such that $$V_{Sup} = V_{in}\left[\frac{R_{U2}}{R_{U1} + R_{U2}}\right]$$

$$V_{SLo} = V_{in}\left[\frac{R_{L2}}{R_{L1} + R_{L2}}\right]$$

where Vin is a power supply determined by the comparator circuit 74. When $V_{SD}$ exceeds the set limits for $V_{SUp}$ or $V_{SLo}$, the comparator circuit 74 triggers and pulls the output ($V_{Cout}$) low.

Further, while the output of the comparator circuit 74 could be output to the transmission controller 28 and utilized to decode the wireless data signals by signaling the rising and falling edges of the ASK modulation, in some examples, the SR latch 76 may be included to add noise reduction and/or a filtering mechanism for the slope detector 72. The SR latch 76 may be configured to latch the signal (Plot C) in a steady state to be read by the transmitter controller 28, until a reset is performed. In some examples, the SR latch 76 may perform functions of latching the comparator signal and serve as an inverter to create an active high alert out signal. Accordingly, the SR latch 76 may be any SR latch known in the art configured to sequentially excite when the system detects a slope or other modulation excitation. As illustrated, the SR latch 76 may include NOR gates, wherein such NOR gates may be configured to have an adequate propagation delay for the signal. For example, the SR latch 76 may include two NOR gates ($NOR_{Up}$, $NOR_{Lo}$), each NOR gate operatively associated with the upper voltage output 78 of the comparator 74 and the lower voltage output 79 of the comparator 74.

In some examples, such as those illustrated in Plot C, a reset of the SR latch 76 is triggered when the comparator circuit 74 outputs detection of $V_{SUp}$ (solid plot on Plot C) and a set of the SR latch 76 is triggered when the comparator circuit 74 outputs $V_{SLo}$ (dashed plot on Plot C). Thus, the reset of the SR latch 76 indicates a falling edge of the ASK modulation and the set of the SR latch 76 indicates a rising edge of the ASK modulation. Accordingly, as illustrated in Plot D, the rising and falling edges, indicated by the demodulation circuit 70, are input to the transmission controller 28 as alerts, which are decoded to determine the received wireless data signal transmitted, via the ASK modulation, from the wireless receiver system(s) 30.

Figure 9:
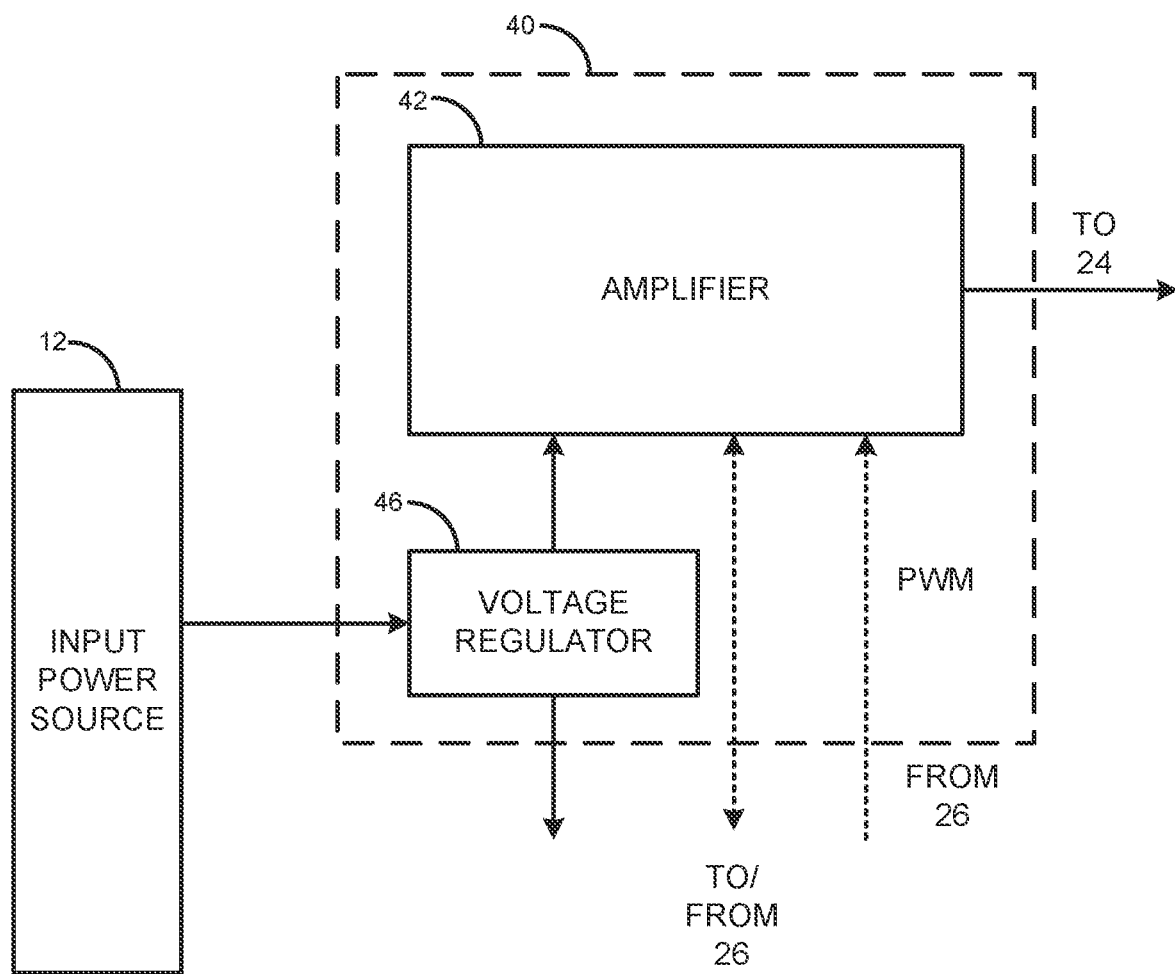
FIG. 9 is a block diagram illustrating components of a power conditioning system of the wireless transmission system of FIG. 2, in accordance with FIG. 1, FIG. 2, and the present disclosure.

Referring now to FIG. 9, and with continued reference to FIGS. 1-5, a block diagram illustrating an embodiment of the power conditioning system 40 is illustrated. At the power conditioning system 40, electrical power is received, generally, as a DC power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an AC as output, based, at least in part, on PWM input from the transmission control system 26. The amplifier 42 may be or include, for example, a power stage invertor, such as a single field effect transistor (FET), a dual field effect transistor power stage invertor or a quadruple field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W. In some examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a single-ended class-E amplifier employs a single-terminal switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, and/or a push-pull invertor, among other amplifiers that could be included as part of the amplifier 42.

Figure 10:
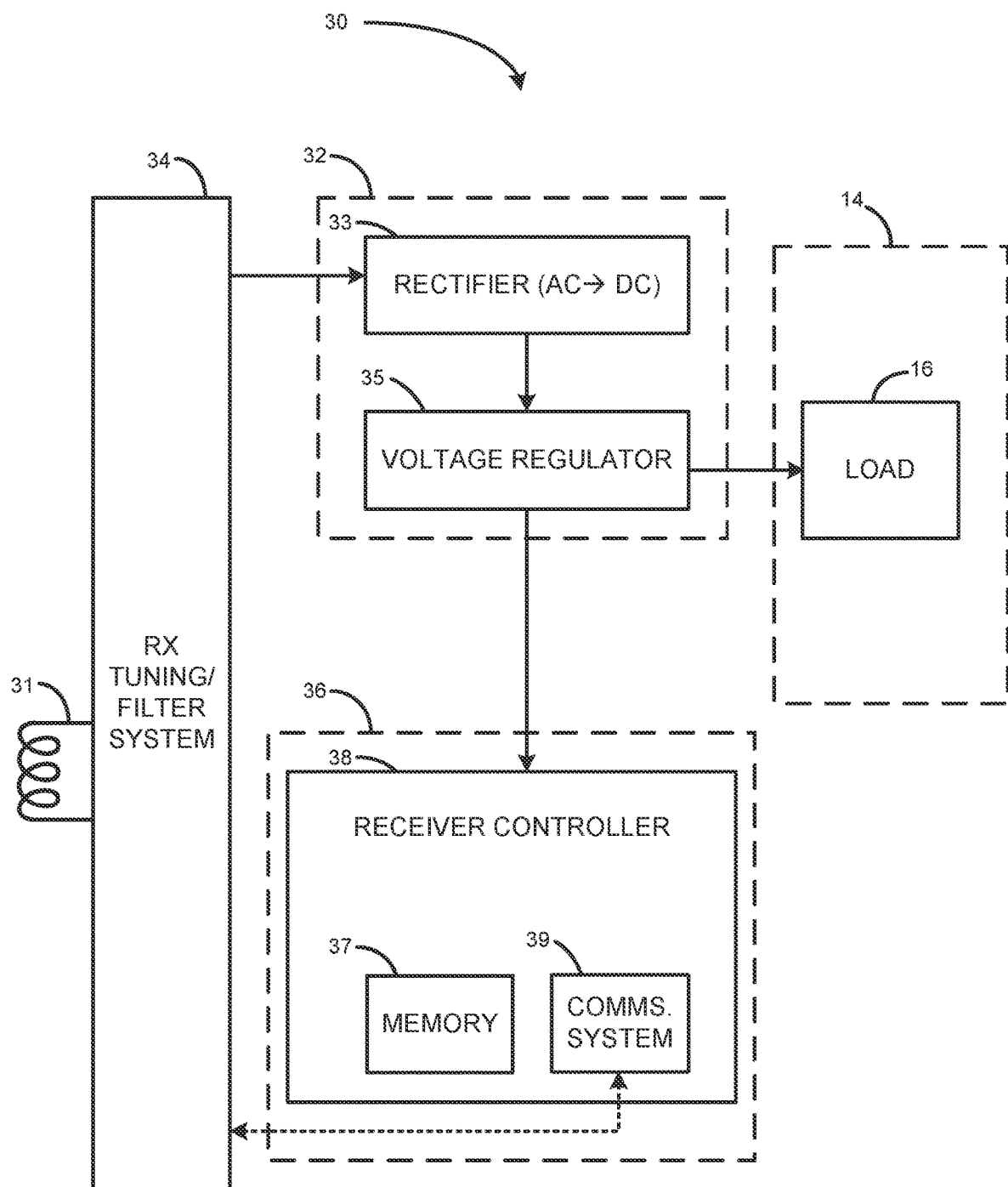
FIG. 10 is a block diagram illustrating components of a receiver control system and a receiver power conditioning system of the wireless receiver system of FIGS. 2, in accordance with FIG. 1, FIG. 2, and the present disclosure.

Turning now to FIG. 10 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As illustrated in FIG. 9, the wireless receiver system 30 includes, at least, the receiver antenna 31, a receiver tuning and filtering system 34, a power conditioning system 32, a receiver control system 36, and a voltage isolation circuit 70. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning and filtering system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a buck convertor, a low dropout (LDO) regulator, a shunt linear voltage regulator, a step up switching voltage regulator, a step down switching voltage regulator, an invertor voltage regulator, a Zener controlled transistor series voltage regulator, a charge pump regulator, and an emitter follower voltage regulator. The voltage regulator 35 may further include a voltage multiplier, which is as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may an LDO linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 (e.g., when the load 16 is a battery and/or other power source) and/or other components of the electronic device 14.

The receiver control system 36 may include, but is not limited to including, a receiver controller 38, a communications system 39 and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller 38 may be a single controller or may include more than one controller disposed to control various functions and/or features of the wireless receiver system 30. Functionality of the receiver controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 38 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5), a flash memory, a portable memory, and the like. Such memory media are examples of nontransitory computer readable memory media.

Further, while particular elements of the receiver control system 36 are illustrated as subcomponents and/or circuits (e.g., the memory 37, the communications system 39, among other contemplated elements) of the receiver control system 36, such components may be external of the receiver controller 38. In some examples, the receiver controller 38 may be and/or include one or more integrated circuits configured to include functional elements of one or both of the receiver controller 38 and the wireless receiver system 30, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller 38 may be a dedicated circuit configured to send and receive data at a given operating frequency. For example, the receiver controller 38 may be a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39 is certainly not limited to these example components and, in some examples, the communications system 39 may be implemented with another integrated circuit (e.g., integrated with the receiver controller 38), and/or may be another transceiver of or operatively associated with one or both of the electronic device 14 and the wireless receiver system 30, among other contemplated communication systems and/or apparatus. Further, in some examples, functions of the communications system 39 may be integrated with the receiver controller 38, such that the controller modifies the inductive field between the antennas 21, 31 to communicate in the frequency band of wireless power transfer operating frequency.

Figure 11:
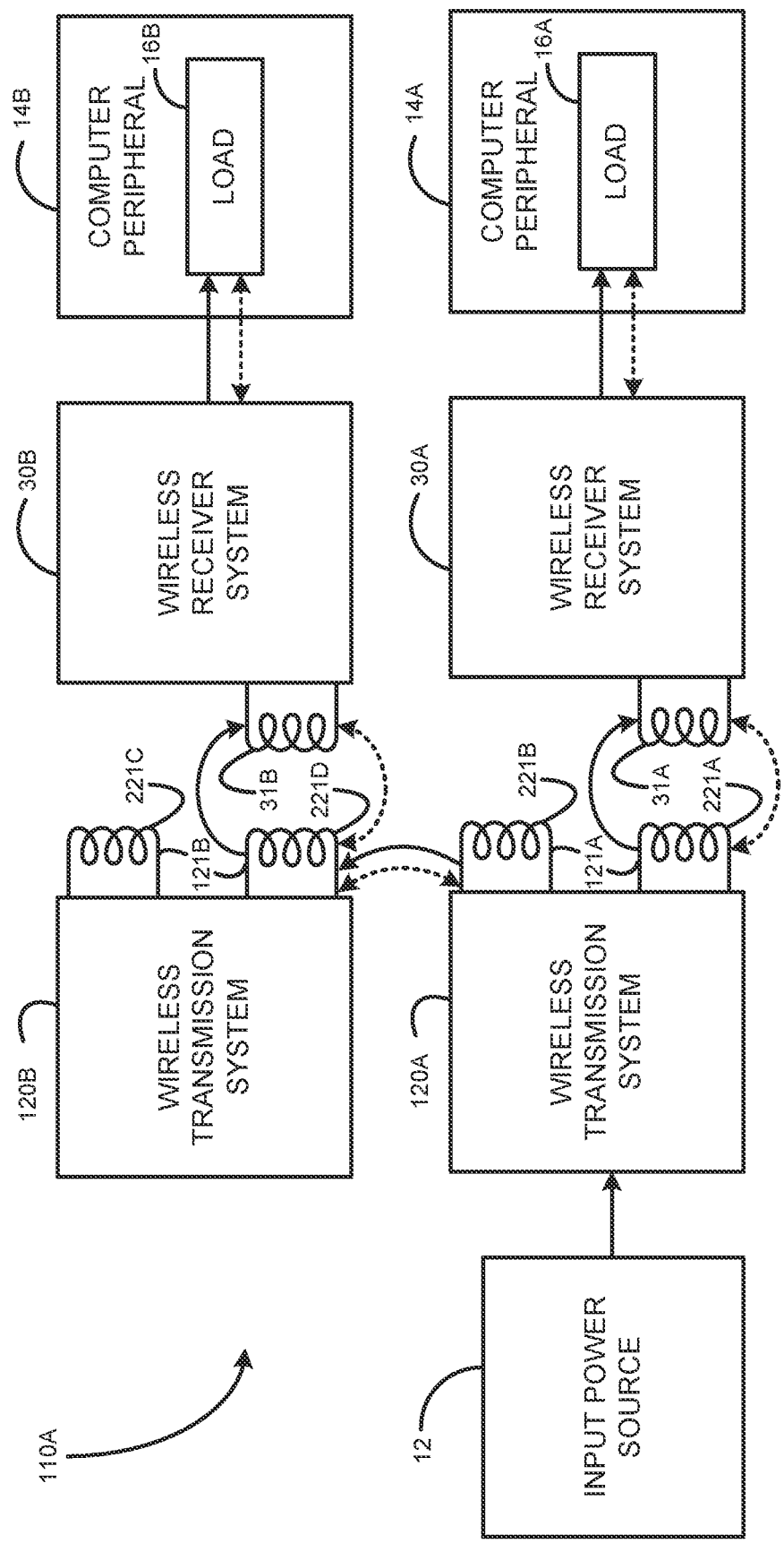
FIG. 11 is a block diagram of another wireless power transfer system, including modular wireless transmission system(s) and at least one wireless receiver system, including like or similar elements to those of the system(s) of FIGS. 1-10, in accordance with FIGS. 1-10 and the present disclosure.

FIG. 11 is a block diagram for another wireless power transfer system 110A, which may utilize one or more wireless transmission systems 120 and one or more wireless receiver systems 30, each wireless receiver system 30 associated with an electronic device 14. Similar to the systems 10 described above, one or more antenna 121, 221 of each wireless transmission system 120 may be configured to function as a repeater antenna and/or a transmission antenna. The transmission antenna 121 of the transmission system(s) 120 may comprise or function as multiple transmission antennas, capable of transmitting wireless power to two or more wireless receiver systems 30, transmitter connected wireless transmission systems 120, or combinations thereof.

In wireless power transfer systems, wherein a high resonant frequency is required (e.g. on the order of about 1 MHz to about 1 GHz), the size of an antenna may be, relatively, limited when compared to lower frequency solutions, due to self-resonant frequency, coil sensitivity, amplifier driving capabilities, and/or low coupling efficiency concerns. In some applications, such as, but not limited to, wireless power transfer systems in which a resonant frequency is above about 5 MHz, these issues may make it difficult for antenna designers to create proper coils having a two-dimensional area greater than, about 200 mm by 200 mm. However, using similarly sized antennas, but coupling each of these similar antennas to a common power amplifier/power system (e.g., the power conditioning system 40) may allow for larger power transfer areas and/or power transfer areas for multiple devices, coupled at higher resonant frequencies. Such designs allow for a system having two or more transmission antennas or antenna portions that are driven by the same transmitter power amplifier in a uniform and efficient way that enables efficient, single and/or simultaneous power transfer in a lower-cost manner that may limit a bill of materials.

In view of the system 110 of FIG. 11, such multiple antenna designs may provide a transmitting device with multiple "sub-areas" that either provide the benefit of a wider power transmission area or allow for multiple devices to be powered by a single transmission system. Further, one or more of such sub-areas may be configured as repeaters to receive wireless power from another wireless power transmitter 120, for subsequent transmission to one or more of a wireless receiver system, another wireless transmission system 120, or combinations thereof.

Figure 12A:
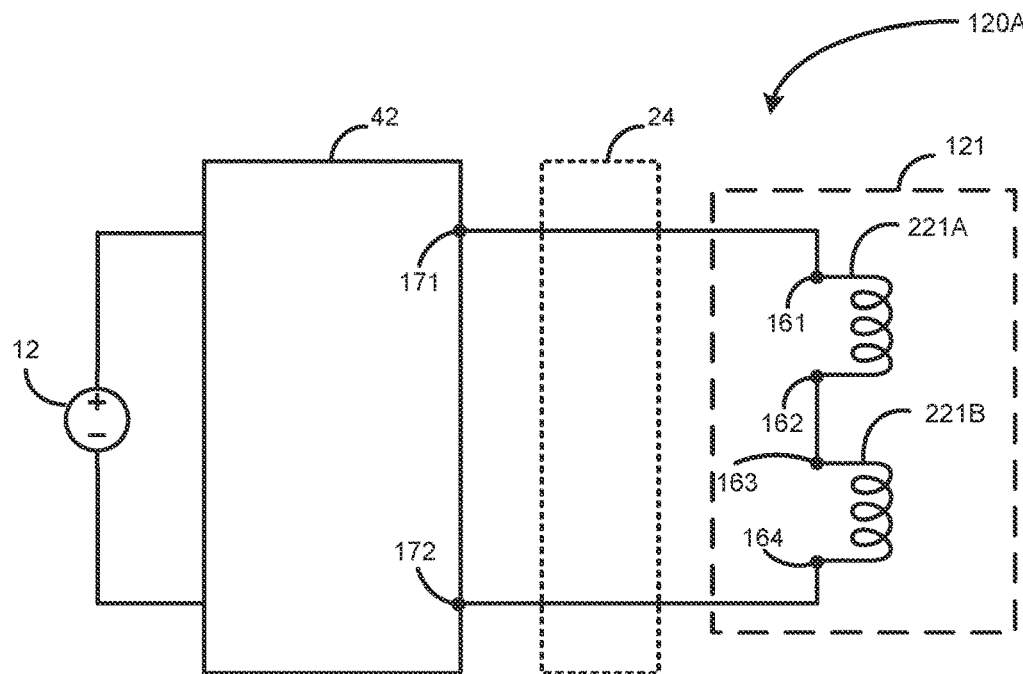
FIG. 12A is a simplified electrical schematic diagram of a wireless power transmitter of FIG. 11, in accordance with FIGS. 1-11 and the present disclosure.
Figure 12B:
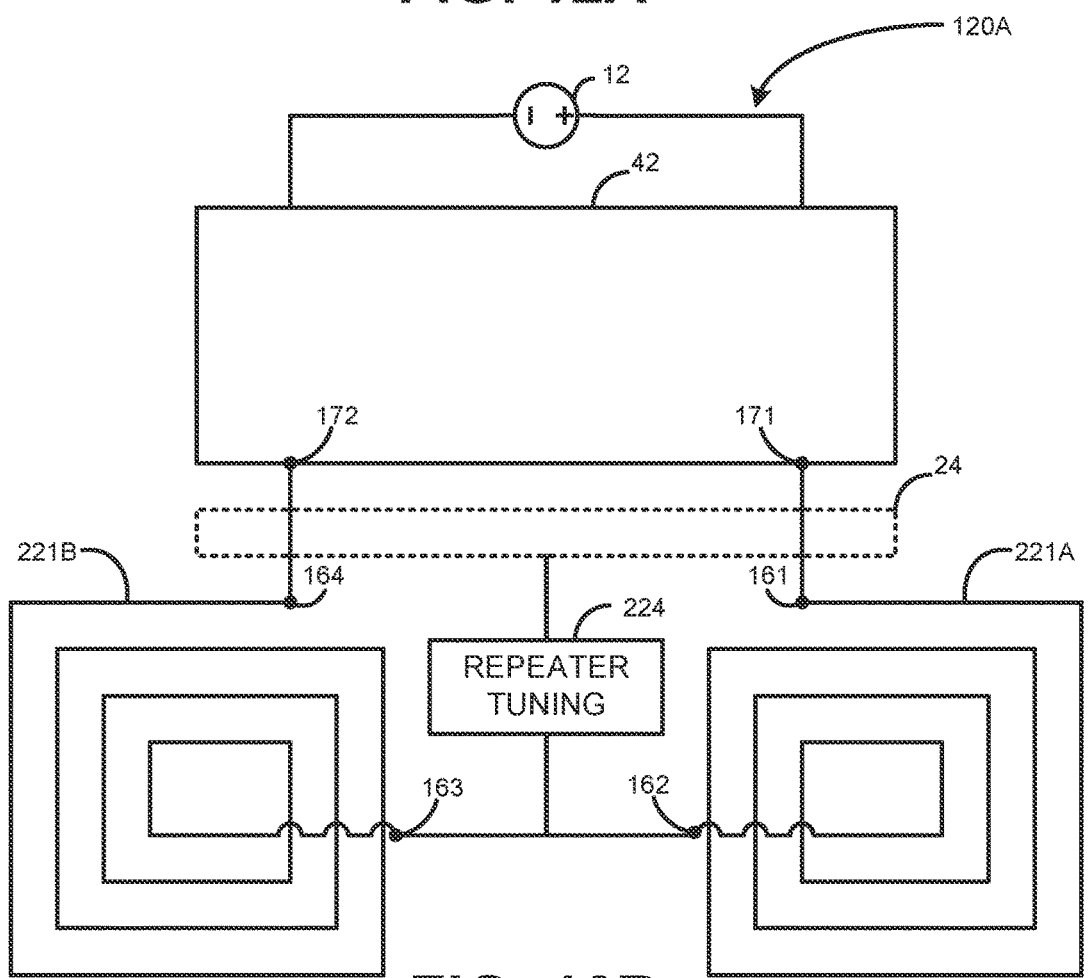
FIG. 12B is another simplified electrical schematic diagram of the wireless power transmitter of FIG. 12A, in accordance with FIGS. 1-12A and the present disclosure.

Turning now to FIGS. 12A-B and with continued reference to FIG. 11, a simplified schematic diagram of the wireless transmission system 120A is illustrated. The transmission antenna 121 may include multiple antenna portions 221A, 221B, which functionally behave as individual antennas 21, while connected to a common power conditioning system 40. As illustrated in FIGS. 12A-B, the transmission antenna 121A includes the first antenna portion 221A, which includes a first terminal 161 and a second terminal 162, and the second antenna portion 221B, which includes a third terminal 163 and a fourth terminal 164. The amplifier 42 includes a first power terminal 171 and a second power terminal 172. As illustrated, to achieve the series antenna-to-amplifier connection, the first terminal 61 of the first antenna portion 221A is in electrical connection with the first power terminal 171, the fourth terminal of the second antenna portion 221B is in electrical connection with the second power terminal 72, and the second terminal 62 of the first antenna portion 221A is in electrical connection with the third terminal 63 of the second antenna portion 221B, thereby establishing the series connection between the transmission antenna portions 221A, 221B, with respect to the amplifier 42.

As discussed above, any of the transmission antennas 21, 121 and/or antenna portions 221 may be configured to function as one or more of a transmission antenna for transmission to a wireless receiver system 30, a repeater antenna for repeating AC wireless signals to another wireless transmission system 20, 120, or combinations thereof. Accordingly, in some examples, the antenna portions 221 may be configured such that one or both of the antenna portions 221A, 221B are configured or tuned to function as a repeater antenna. To that end, the wireless transmission system 120 may include a repeater tuning system 224, which may be part of or independent from the transmission tuning system 24 of the wireless transmission system 120. In some examples, the repeater tuning system 224 may include one or more passive components (e.g., capacitors) configured and/or tuned to isolate the magnetic fields generated by each of the antenna portions 221, 221B from one another. Such tuning is performed to limit interference or crosstalk between the two antenna portions 221A, 221B.

To isolate the magnetic fields, the repeater tuning system 224 may be configured to phase shift the AC wireless signal when it passes, in series, from the first antenna portion 221A to the second antenna portion 221B. Such a phase shift may be configured to shift the waveform of an AC wireless signal of first antenna portion 221A about 90 degrees from the phase of the waveform of an AC wireless signal of the second antenna portion 221B. By phase shifting the two respective AC wireless signals of the first and second antenna portions 221A, 221B by about 90 degrees, the repeater tuning system 224 may prevent loss or interference between transmitted signals or fields from either antenna portion 221A, 221B. Further, such phase shifting may aid in functionally isolating the first antenna portion 221A and the second antenna portion 221B, such that each portion 221A, 221B may functionally act as an independent transmitter and/or repeater antenna 21. Additionally or alternatively, the repeater tuning system 224 and/or components thereof may be utilized to filter out high frequency harmonics from the AC wireless signals.

Figure 13A:
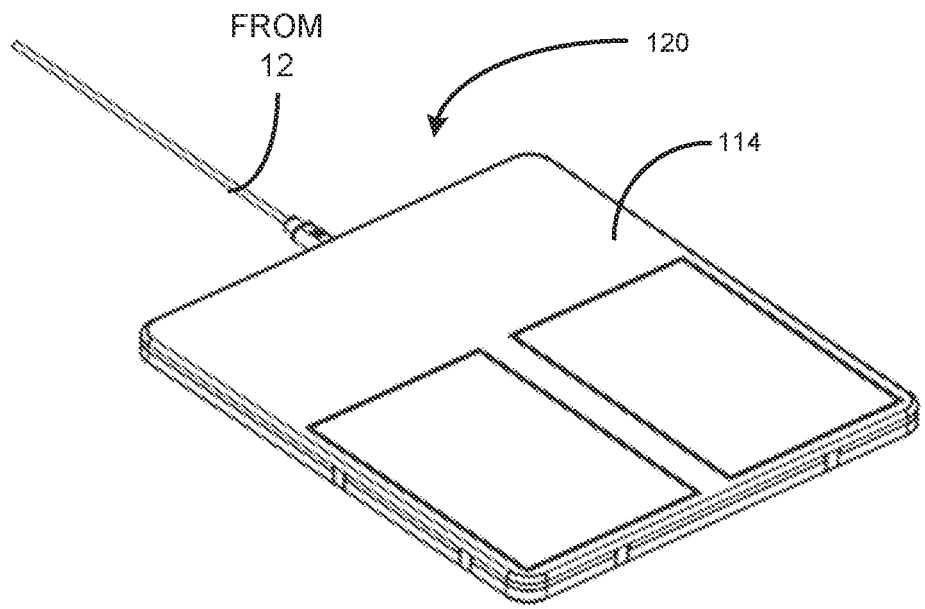
FIG. 13A is a top perspective view of a modular wireless power transmitter of FIGS. 11-12, residing in a housing, in accordance with FIGS. 1-12 and the present disclosure.

FIG. 13A illustrates a top perspective view of an example wireless transmission system 120, in view of FIGS. 11=12, wherein the wireless transmission system 120 is housed by a transmitter housing 114. The transmitter housing 114 may be any mechanical body capable of supporting, enclosing, and/or otherwise positioning the wireless transmission system 120, for use in transmitting AC wireless signals to one or more of a wireless receiver system 30, a wireless transmission system 20, 120, or combinations thereof. As illustrated, the particular wireless transmission system 120 of FIG. 13A is an input connected wireless transmission system 120, as it is connected to the input power source 12.

Figure 13B:
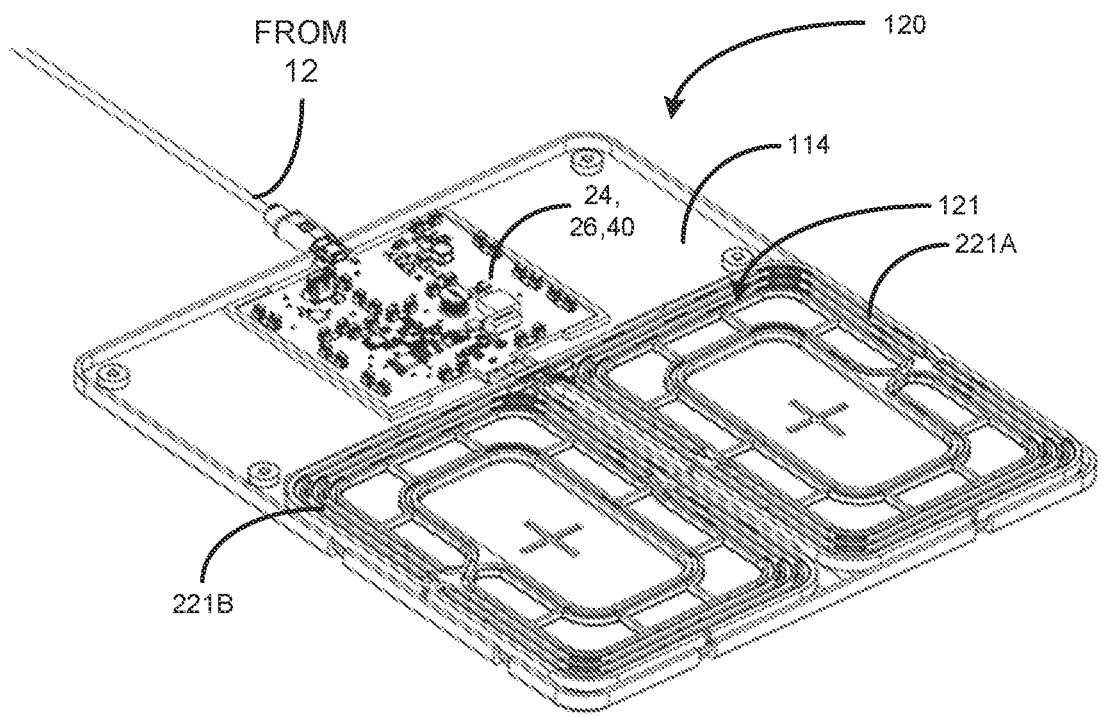
FIG. 13B is another top perspective view of the modular wireless power transmitter of FIG. 13A, but with a top of the housing removed from view, in accordance with FIGS. 1-13A and the present disclosure.

FIG. 13B illustrates the housed wireless transmission system 120, but with a top surface of the transmitter housing 114 removed or made invisible. Thus, FIG. 12B shows the transmitter housing 114 supporting the transmission antenna 121 and providing space and enclosure for circuit elements of the wireless transmission system 120, such as, but not limited to, the transmission tuning system 24, the repeater tuning system 24, the sensing system 50, the transmission control system 26, and the power conditioning system 40.

The wireless transmission systems 120 are configured to be modular wireless power transmitters, reconfigurable wireless power transmitters and/or modular power transmitting pads for powering and/or charging computer peripherals. Any number of wireless transmission systems 120 may be modularly configured, with one another, to produce any size or scale of wireless power networks, for powering and/or charging any number of computer peripherals 14 via wireless receiver systems 30. The wireless transmission systems 120 may utilize their capabilities to function as repeaters, wherein the repeater functionality enables modularity by extending the power or charging area, without need for additional connections to an input power source 12. FIGS. 14-16, below, represent non-limiting examples of modularly configured configurations of the wireless power transfer system 110.

Figure 14A:
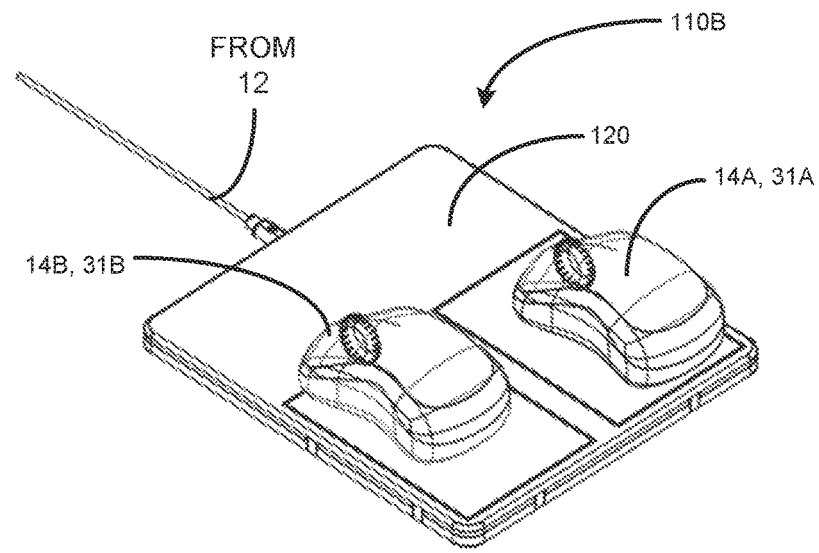
FIG. 14A is an illustration of a configuration of the wireless power transfer system of FIGS. 1-13 and associated computer peripheral(s), in accordance with FIGS. 1-13B and the present disclosure.
Figure 14B:
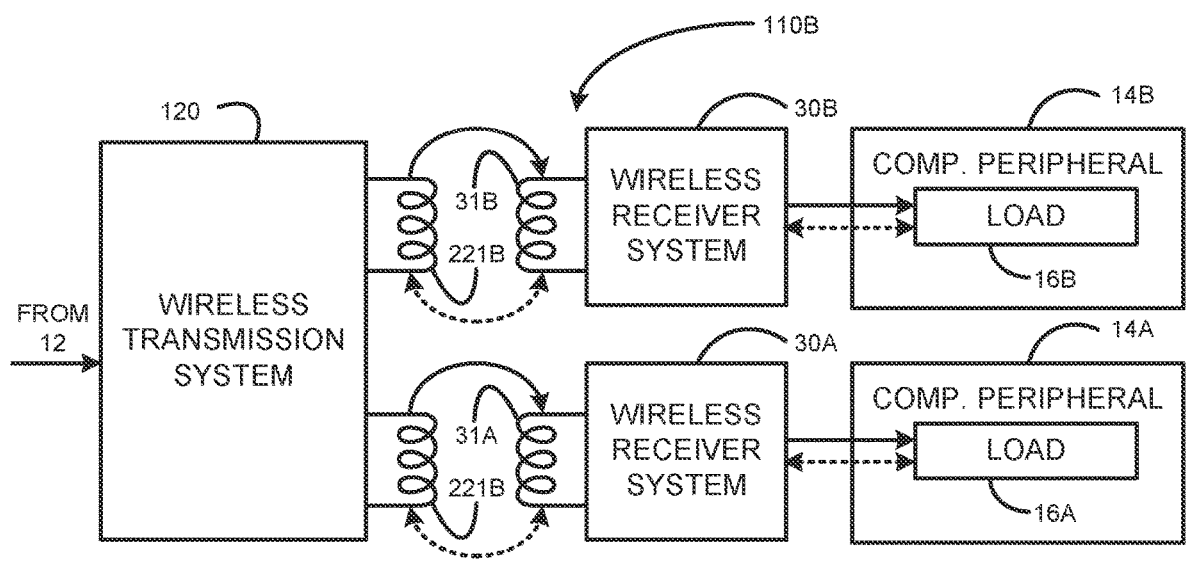
FIG. 14B is a block diagram of the wireless power transfer system of FIG. 11, but illustrating components utilized in the configuration of FIG. 14A, in accordance with FIGS. 1-13B, 14A, and the present disclosure.

FIGS. 14A and 14B are representative of a first configuration 110B of the wireless power transfer system 110. FIG. 14A is a perspective view of the wireless power transfer system 110B having multiple computer peripherals 14, configured with wireless receiver systems 30, positioned such that they are capable of receiving AC wireless signals from the wireless transmission system 120. In the first configuration 110B, a wireless power transmission system 120 includes first and second antenna portions 221A, 221B and each are functioning as wireless transmission antennas, thus, coupling and transmitting AC wireless signals to wireless receiver systems 30A, 30B, each associated, respectively, with electronic devices 14A, 14B. The wireless transmission system 120 is capable of functioning to power or charge at least two wireless receiver systems, utilizing a single transmission system 120.

Figure 15A:
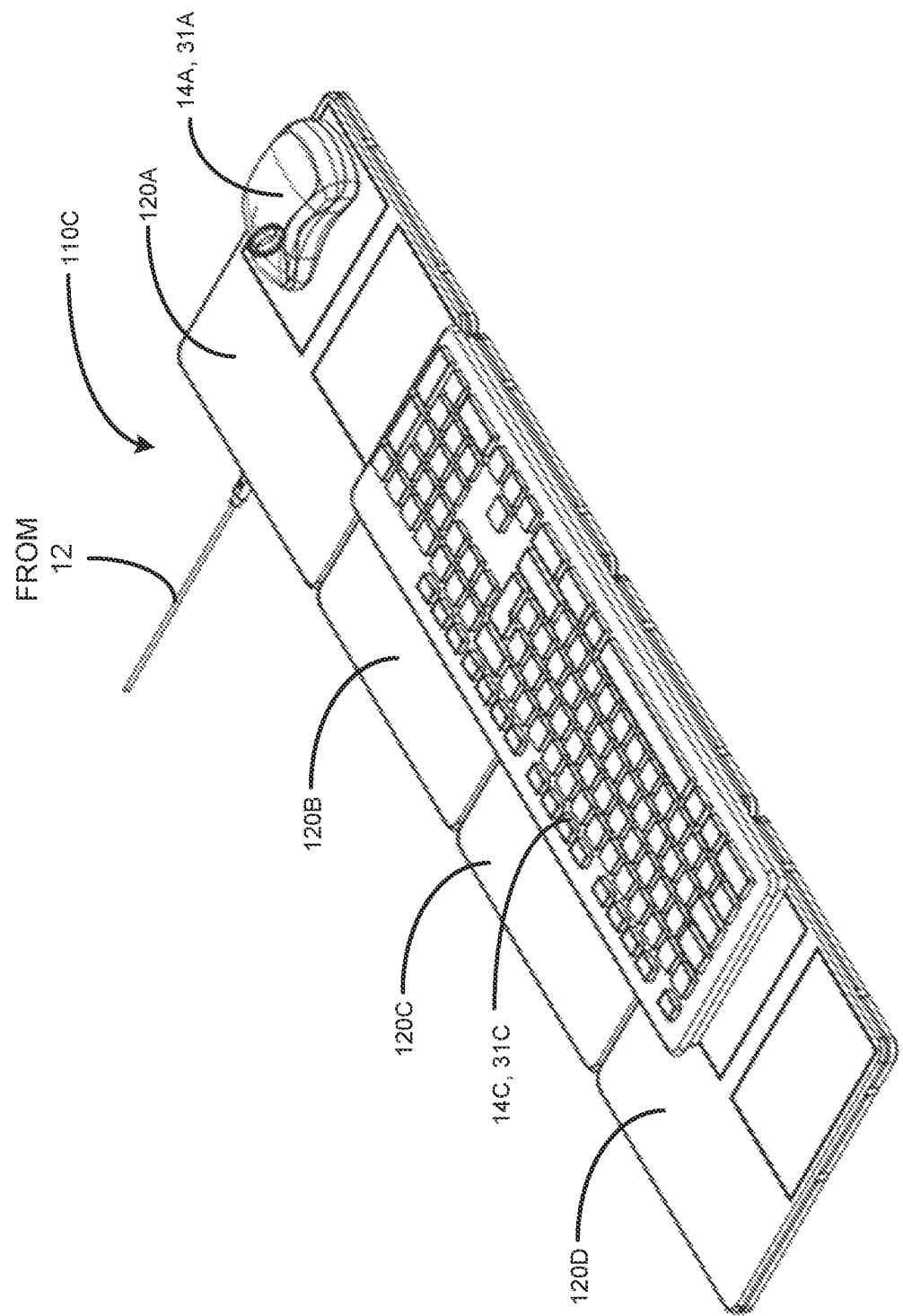
FIG. 15A is an illustration of a configuration of the wireless power transfer system of FIGS. 1-13 and associated computer peripheral(s), in accordance with FIGS. 1-13B and the present disclosure.
Figure 15B:
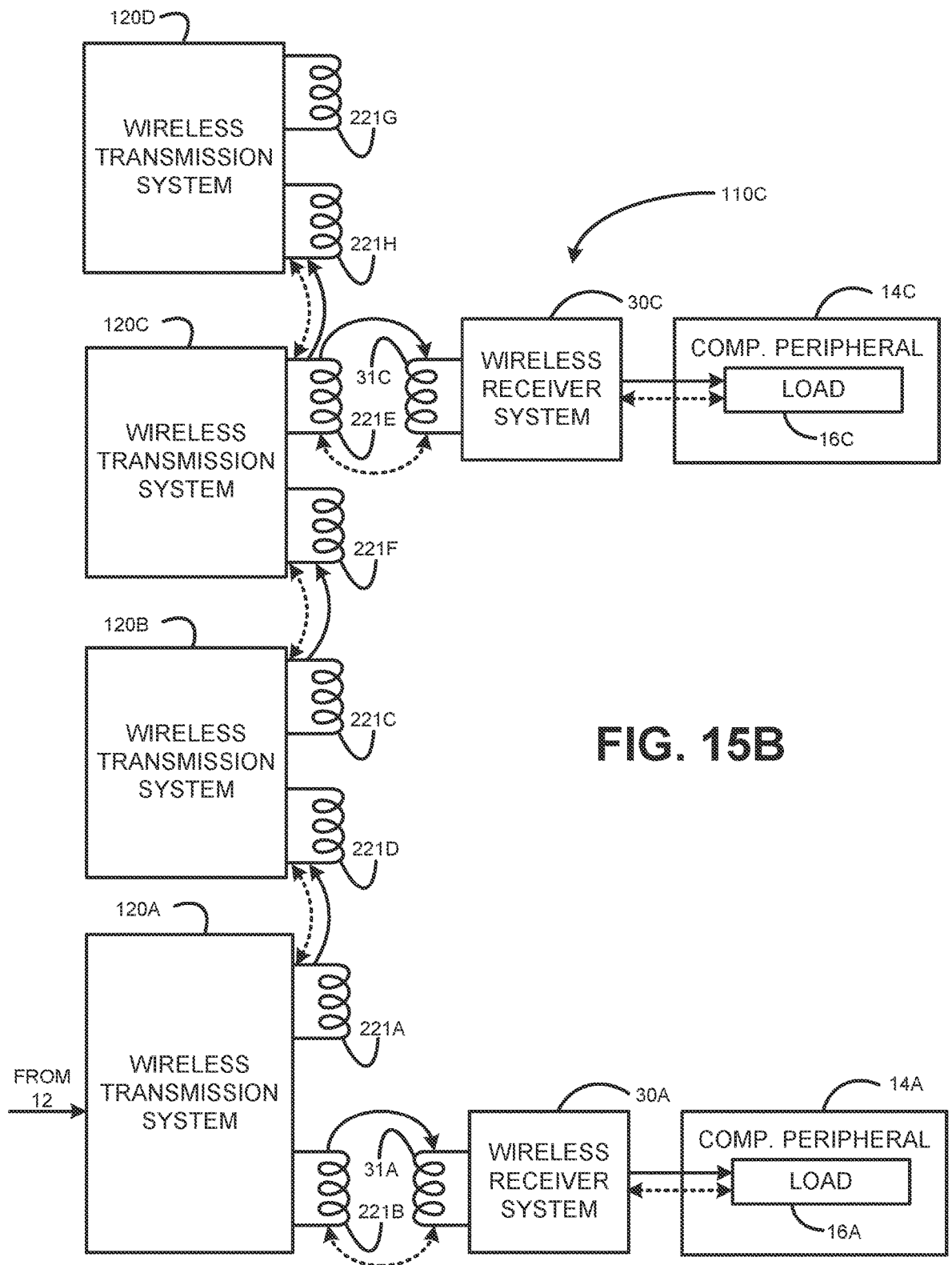
FIG. 15B is a block diagram of the wireless power transfer system of FIG. 11, but illustrating components utilized in the configuration of FIG. 15A, in accordance with FIGS. 1-13B, 15A, and the present disclosure.

FIGS. 15A and 15B are representative of a second configuration 110C of the wireless power transfer system 110, wherein FIG. 15A is a top perspective view of the wireless transmission systems 120 and the computer peripherals 14 and FIG. 15B is a schematic illustration of electronic components of the same. The configuration 110C includes a network of multiple wireless transmission systems 120A, 120B, 120C, 120D all functioning, in connection, as a common wireless power transmission system for powering the wireless receiver systems 30 of the computer peripherals 14. As illustrated, the first wireless transmission system 120A is connected to the input power source 12 and, thus, is an input source connected wireless transmission system 120, while all of the remaining wireless transmission systems 120B, 120C, 120D are not connected to the input power source 12 and, thus, are transmitter connected wireless transmission systems 120B, 120C, 120D.

As best illustrated in the schematic diagram of FIG. 15B, the wireless transmission systems 120B, 120C, 120D are configured as a network of transmitter/repeater systems, receiving input power from the input source connected wireless transmission system 120A and repeating the AC wireless signal throughout, for ultimate transmission to a wireless receiver system 30. More specifically, as illustrated, a signal path of the AC wireless signals begins at the circuitry of the first wireless transmission system, travels to the first and second antenna portions 221A, 221B, wherein the second portion 221B transmits the AC wireless signals to a first wireless receiver system 30A. The first antenna portion 221A is configured to transmit the AC wireless signals, by coupling with a fourth antenna portion 221D of the second wireless transmission system 120B. The fourth antenna portion 221D receives the AC wireless signals, processes the AC wireless signals in its transmission tuning system 24 and/or repeater tuning system 224, and provides AC wireless power signals to the third antenna portion 221C of the second wireless transmission system 120C.

The third antenna portion 221C transmits the AC wireless signals to a sixth antenna portion 221F of the third wireless transmission system 120C. The sixth antenna portion 221F receives the AC wireless signals, processes the AC wireless signals in its transmission tuning system 24 and/or repeater tuning system 224, and provides AC wireless power signals to the fifth antenna portion 221E of the third wireless transmission system 120C. The fifth antenna portion 221E, as illustrated in the configuration 110C, may both repeat the AC wireless signals to the fourth wireless transmission system 120D and provide the AC wireless signals to a second wireless transmission system 30C, with which the fifth antenna portion 221E is coupled. While illustrated as coupled with the fifth antenna portion 221E, it is certainly possible that the second wireless receiver system 30C may couple with any of the antenna portions 221B-G.

The repeated AC wireless signal from the fifth portion 221E may be received by an eighth antenna portion 221H of the fourth wireless transmission system 120D. As illustrated, because there are no additional wireless transmission systems 120 in the signal path of the fourth wireless transmission system 120D, the signal path may end/loop back at the seventh antenna portion 221G; however, if a receiver system 30 or additional wireless transmission system 120 were placed within coupling range of one or both of the seventh and eight antenna portions 221G, 221H, the portions 221G, 221H would be capable of transmitting the AC wireless signals further.

While the individual wireless transmission systems 120 are illustrated without any visible mechanical connections, to, for example, hold the wireless transmission systems 120 in place to form a larger powering or charging area, it is certainly contemplated that one or more mechanical features may be integrated with the housing(s) 114 to enable positioning features and/or to maintain positioning of the wireless transmission systems 120, to facilitate proper wireless power transmission and/or wireless power repetition. Such mechanical features may include, but are not limited to including, "male" and "female" mechanical indents configured to hold the wireless transmission systems 120 in place, latches and/or locks configured to connect two or more wireless transmission systems 120, magnetic connectors to attract a first wireless transmission system 120 to a second wireless transmission system 120, mechanical connectors for affixing a wireless transmission system 120 to an external surface (e.g., a desktop, a table top, a counter top, and the like), among other contemplated mechanical connection features utilized to position one or more wireless transmission systems 120 in place to facilitate proper wireless power transfer and/or repetition.

Figure 16A:
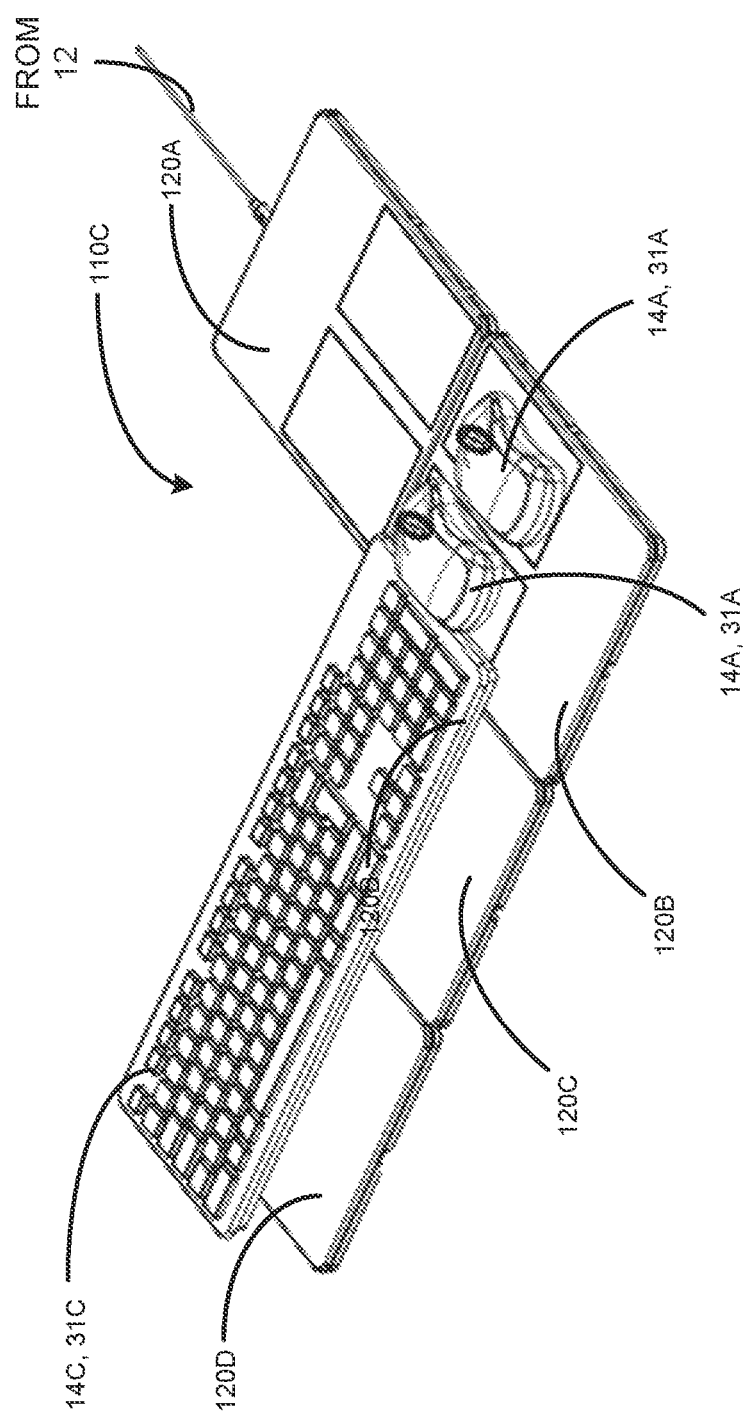
FIG. 16A is an illustration of a configuration of the wireless power transfer system of FIGS. 1-13 and associated computer peripheral(s), in accordance with FIGS. 1-13B and the present disclosure.
Figure 16B:
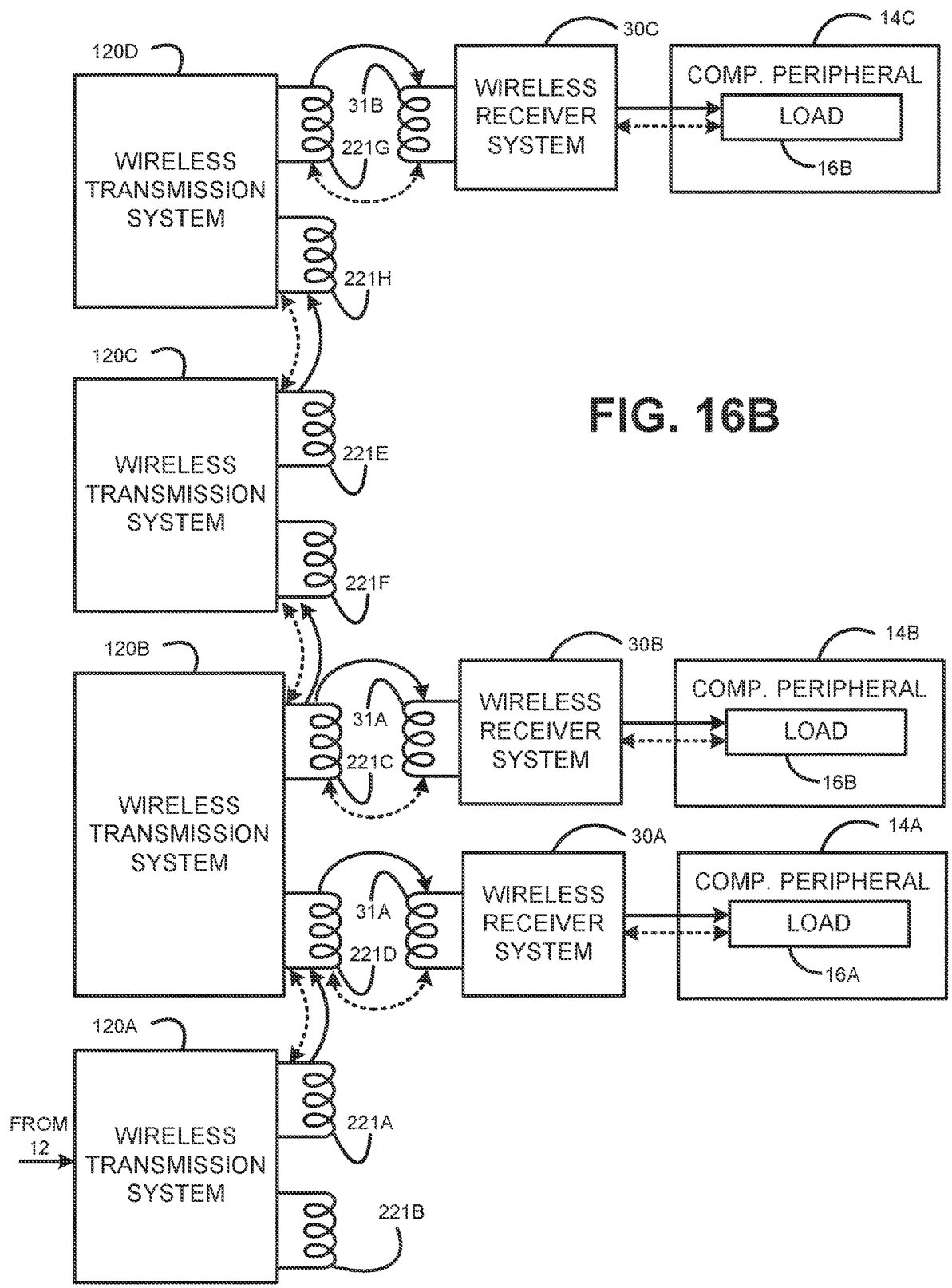
FIG. 16B is a block diagram of the wireless power transfer system of FIG. 11, but illustrating components utilized in the configuration of FIG. 16A, in accordance with FIGS. 1-13B, 16A, and the present disclosure.

FIGS. 16A and 16B are representative of a third configuration 110D of the wireless power transfer system 110, wherein FIG. 16A is a top perspective view of the wireless transmission systems 120 and the computer peripherals 14 and FIG. 16B is a schematic illustration of electronic components of the same. The configuration 110D includes a network of multiple wireless transmission systems 120A, 120B, 120C, 120D all functioning, in connection, as a common wireless power transmission system for powering the wireless receiver systems 30 of the electronic devices 14. As illustrated, the first wireless transmission system 120A is connected to the input power source 12 and, thus, is an input source connected wireless transmission system 120, while all of the remaining wireless transmission systems 120B, 120C, 120D are not connected to the input power source 12 and, thus, are transmitter connected wireless transmission systems 120B, 120C, 120D.

In FIGS. 16A, B, the wireless transmission systems 120B, 120C, 120D are configured as a network of transmitter/repeater systems, receiving input power from the input source connected wireless transmission system 120A and repeating the AC wireless signal throughout, for ultimate transmission to a wireless receiver system 30. More specifically, as illustrated, a signal path of the AC wireless signals begins at the circuitry of the first wireless transmission system 120A, travels to the first and second antenna portions 221A, 221B, wherein the second portion 221B repeats the AC wireless signals to a fourth antenna portion 221D of the second wireless receiver system 120B. The fourth antenna portion 221D receives the AC wireless signals, transmits the AC wireless signals to a receiver antenna 31A of a wireless receiver system 30A, processes the AC wireless signals in its transmission tuning system 24 and/or repeater tuning system 24, and provides AC wireless power signals to the third antenna portion 221C of the second wireless transmission system 120B.

The third antenna portion 221C is configured to receive the processed AC wireless signals from the fourth antenna portion 221D, transmit the AC wireless signals to a second wireless receiver system 30B, and repeat the AC wireless signals to a sixth antenna portion 221F. The AC wireless signals, received by the sixth antenna portion 221F, are processed by a tuning system 24 or repeater tuning system 224 associated with the sixth antenna portion 221F and received by a fifth antenna portion 221E. The fifth antenna portion 221 repeats the AC wireless signals to an eighth antenna portion 221H. The AC wireless signals, received by the eighth antenna portion 221H, are processed by a tuning system 24 and/or repeater tuning system 224 associated with the eighth antenna portion 221H and received by a seventh antenna portion 221G.

The AC wireless signals received by the seventh antenna portion 221G are transmitted to a third wireless receiver system 30C. As illustrated, because there are no additional wireless transmission systems 120 in the signal path of the fourth wireless transmission system 120D, the signal path may end/loop back at the seventh antenna portion 221G; however, if a receiver system 30 or additional wireless transmission system 120 were placed within coupling range of one or both of the seventh and eight antenna portions 221G, 221H, the portions 221G, 221H would be capable of transmitting the AC wireless signals further.

It is to be noted that, while the wireless transmission systems 120 are illustrated in a positioning such that computer peripherals 14 are located proximate to a top face of the wireless transmission systems(s) 120, for the purposes of wireless power transfer to the computer peripherals 14, the computer peripherals 14 need not, solely, be positioned atop the wireless transmission system(s) 120 to receive electrical signals from one or more wireless transmission system(s) 120. Alternatively, the wireless transmission system(s) 120 may be configured such that an computer peripherals 14 receives wireless signals from one or more wireless transmission system(s) 120 when the computer peripherals 14 are positioned at one or more of a top surface of one or more wireless transmission system(s) 120, adjacent to one or more wireless transmission system(s) 120, beneath one or more wireless transmission system(s) 120, or combinations thereof, among other contemplated proximate positionings of one or more computer peripherals 14 with respect to one or more wireless transmission system(s) 120.

While the electronic devices 14 in FIGS. 14-16, as illustrated, resemble input devices like a mouse or keyboard, computer peripherals 14 that are capable of being powered and/or charged by the modular wireless transmission systems 120 are certainly not limited to the illustrated computer peripherals. Accordingly, the modular wireless transmission systems 120 may be configured to power other computer peripherals, such as audio devices, video devices, mobile devices, game controllers, conference equipment, among other electronic devices mentioned above with reference to FIG. 1.

Figure 17:
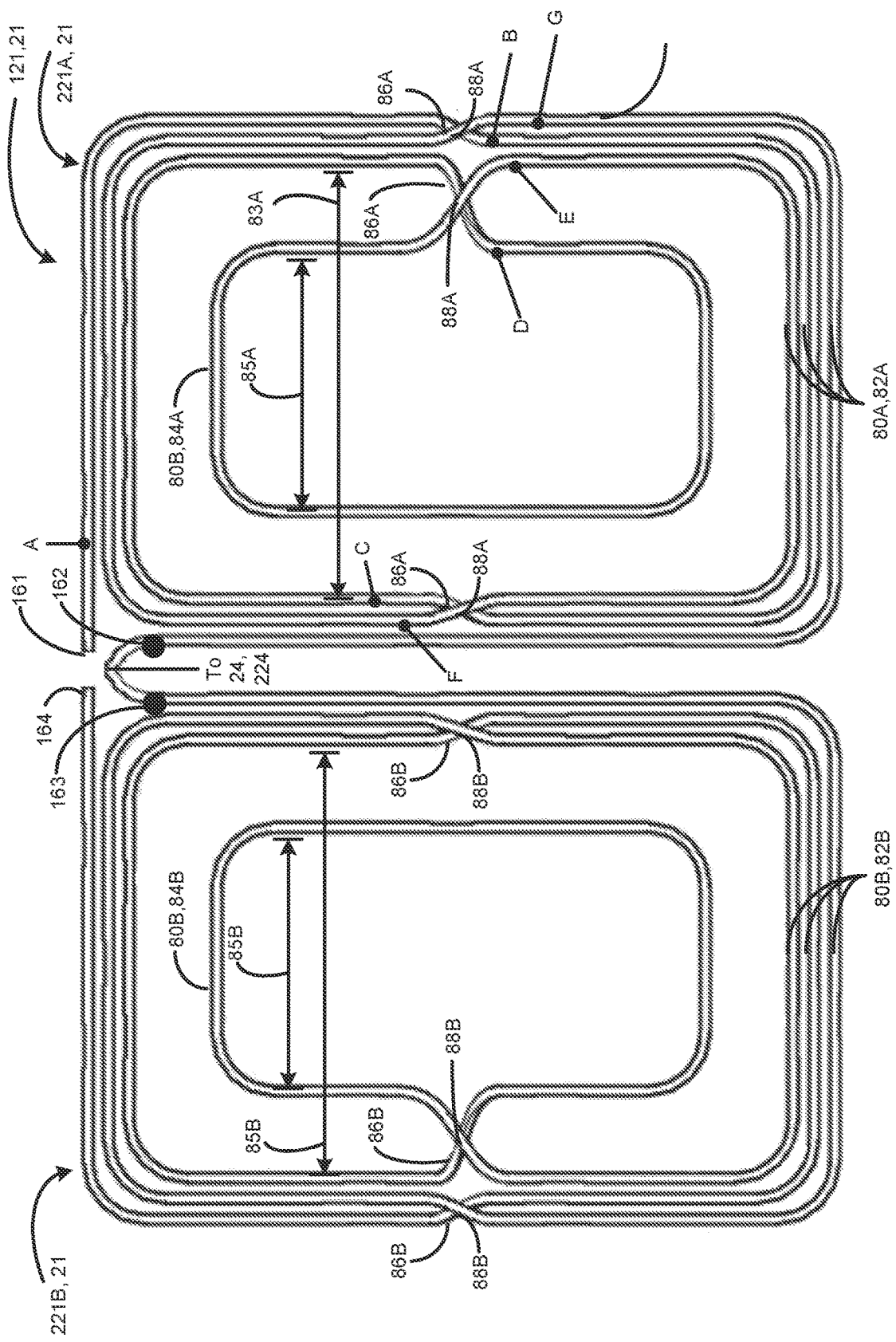
FIG. 17 is a top view of a transmission antenna including two portions which may operate as virtual independent antennas, for use with the system(s) of FIGS. 1-16B, in accordance with FIGS. 1-16B and the present disclosure

FIG. 17 is a top view of an embodiment of the transmission antenna 121, which may be utilized as the transmission antenna 21 and may include first and second antenna or coil portions 221A, 221B. As discussed above, the transmission antenna 121 may be configured such that each of the antenna portions 221A, 221B function as separate antennas; alternatively, the antenna portions 221A, 221B may be configured to extend a charging and/or powering envelope/or improve uniformity of magnetic field distribution, relative to the surface area of the transmission antenna 121. Further, as discussed above, one or more components may, electrically, intersect the signal path between the first and second antenna portions 221A, 221B, at, for example, a location between the second and third terminals 162, 163. Such components may include, for example, the repeater tuning system 224.

While the transmission antenna 121 of FIG. 17 is referenced as a "transmission antenna," it is certainly possible that a like or similar antenna to the transmission antenna 121, having a common and/or similar geometry to the transmission antenna 121, may be utilized as a wireless receiver antenna 31. Such use of the antenna 121 as a receiver antenna may be useful in a wireless power transfer scenario in which a large wireless power receiving area is desired, such receiving area having a substantially uniform coupling area for power receipt from one or more wireless transmission systems 20, 120.

Each of the first and second antenna portions 221A, 221B include a plurality of turns 80A, 80B, respectively. Each of the plurality of turns 80 includes at least one inner turn 84 and at least one outer turn 82. At least one of the inner turns has an inner turn width 85, and at least one outer turn 82 has an outer turn width 83. While the inner turn width 85 and the outer turn width 83 may vary along the circumferential locations of any of the turns 80, generally, inner turn widths 85 are less than outer turn widths 83 at similar and/or parallel points on substantially concentric turns of the antenna portion 221. While the first and second coil portions 221A, 221B are illustrated with multiple turns 80, it is certainly possible for either of the first and second coil portions 221A, 221B to function, for the purposes of the transmission antenna 121 and/or the system 120, while having only a single turn.

To create the coil geometry for one or both of the antenna 121 and the antenna portions 221, wherein each antenna portion 221 may be functionally independent, the antenna 121 includes one or more wire crossovers, which electrically connect two turns of the antenna 121, while insulating said turns from one or more proximal turns. For example, the at least one inner turn 84 may be electrically connected to the at least one outer turn via a crossover 86. Additionally or alternatively, current in the at least one outer turn 82 may flow from a first outer turn 82 to a second turn 82 via a crossover 86. The crossovers 86 allow for the current path in the antenna 121 to fully traverse each of the antenna portions 221, prior to entering the opposing antenna portion 221.

To illustrate and describe the current path in the transmission antenna 121, locations A-G are marked on the first antenna portion 221A. The electrical current enters the first antenna portion 221 at or proximate to the first terminal 161, as denoted by the location A on the transmission antenna 121. The current flows through the outermost turn of the outer turns 82A, until it reaches a first crossover 86A, wherein the wire crosses over into a second turn of the outer turns 82A that is inward of the outermost turn 82A, as depicted at location B. The current continues to flow in the middle turn 82A until it reaches another crossover 86, wherein the wire and, thus, current crosses over into the innermost turn of the outer turns 82A, as depicted at location C. The current continues to flow through to location D, wherein it encounters another crossover and enters the inner turn 84A. The current then flows entirely through the inner turn 84A and exits back at the crossover it enters, travelling into the innermost turn of the outer turns 82A, as depicted at location E. The current then will reverse the travel it made inward, flowing from point E to point F, crossing over into the middle outer turn 82A, to the location G, crossing over into the outermost outer turn 82A, and eventually arriving at the second terminal 162. Then, in some examples, the current may flows to one or more of a transmission tuning system 24, a repeater tuning system 224, the second antenna portion 221B, or combinations thereof, as the current travels from the second terminal 162 to the third terminal 163. The current enters the second antenna portion 221B at the third terminal 63 and similarly will flow outward to inward then back outward to the fourth terminal 64, in reverse but like manner to the current flow of the current flow through the first antenna portion 221A, as described herein.

In some examples, the transmission antenna 121 may be a wire wound antenna comprising a conductive wire formed in a shape with the characteristics disclosed herein. In some such examples, the conductive wire may be a continuous conductive wire, extending from the first terminal 161 to the fourth terminal 164. It is to be contemplated that a continuous wire includes wires that have a tap or exterior connector at any location, such as, but not limited to, between the second and third terminals 62, 63. However, the antenna 121 is not limited to being formed as a wire wound antenna and the transmission antenna 121 may be implemented as a printed circuit board (PCB), flexible printed circuit board (FPC), and/or any other printed or non-printed antenna implementation.

As illustrated, the crossovers 86 are positioned at portions where a first portion of the conductive wire has to cross over a second portion of the conductive wire, without forming an electrical connection between the first and second portions of the conductive wire Therefore, an insulator 88 may be positioned between the first and second portions of the conductive wire, such that when a crossover 86 occurs, there is no conduction or interruption of the aforementioned signal path at a crossover 86.

By utilizing the transmission antenna of FIG. 17 and the intelligent placement of the crossovers 86, the antenna 121 may effectively function as multiple antennas capable of transmission to multiple receivers. Further, due to the spacing of the inner and outer turns 84, 82, a more uniform charge envelope may be achieved, leading to greater spatial freedom for the receiver when placed relative to the transmission antenna 121. Thus, having a higher density of turns on the outer edges of the antenna 121 may prevent dead spots or inconsistent coupling, when a receiver is positioned proximate to an outer edge of the wireless transmission system 120.

Figure 18:
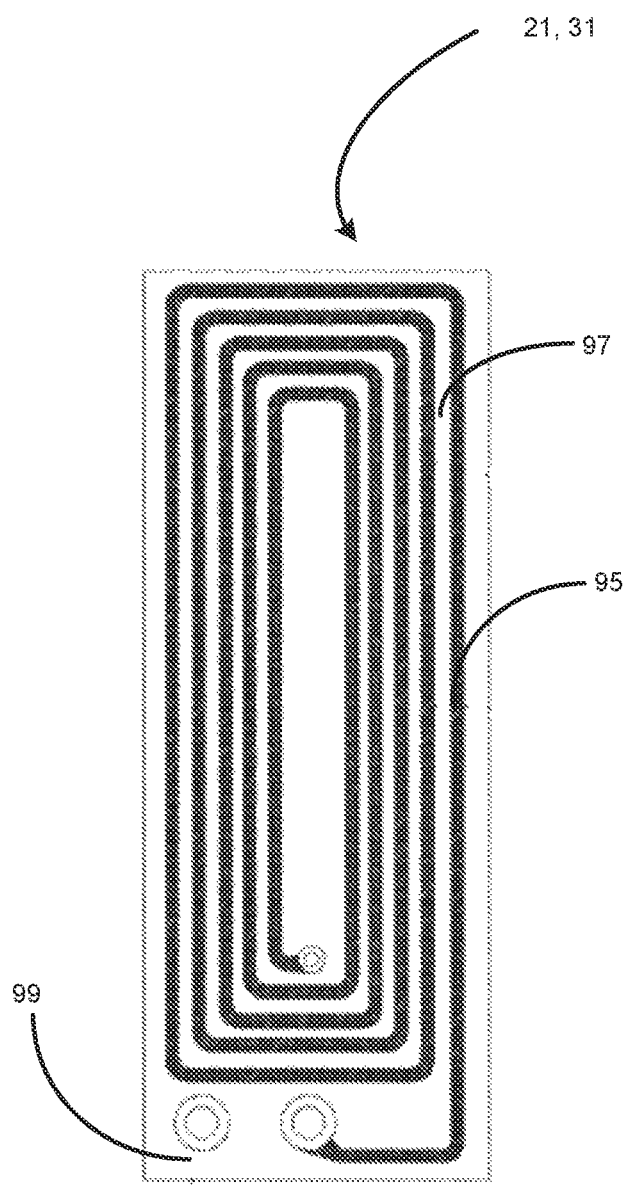
FIG. 18 is a top view of a non-limiting, exemplary antenna, for use as one or both of a transmission antenna and a receiver antenna of the system of FIGS. 1-8, 10-12 and/or any other systems, methods, or apparatus disclosed herein, in accordance with the present disclosure.

FIG. 18 illustrates an example, non-limiting embodiment of the receiver antenna 31 that may be used with any of the systems, methods, and/or apparatus disclosed herein. In the illustrated embodiment, the antenna 31, is a flat spiral coil configuration. Non-limiting examples can be found in U.S. Pat. Nos. 9,941,743, 9,960,628, 9,941,743 all to Peralta et al.; 9,948,129, 10,063,100 to Singh et al.; U.S. Pat. No. 9,941,590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference.

In addition, the antenna 31 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 21, 31 may be any antenna capable of the aforementioned higher power, high frequency wireless power transfer.

Figure 19:
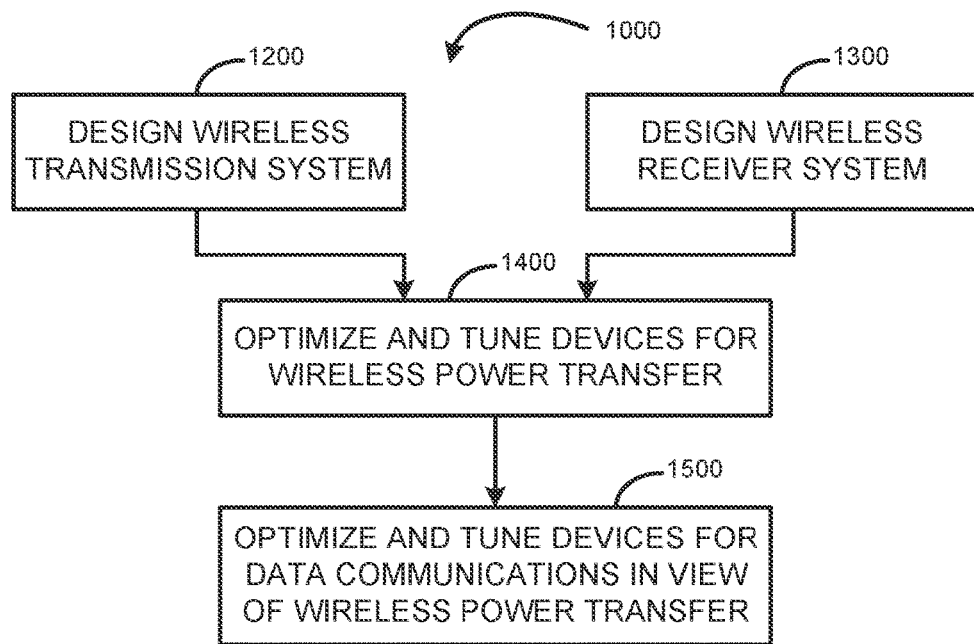
FIG. 19 is an exemplary method for designing a system for wireless transmission of one or more of electrical energy, electrical power signals, electrical power, electrical electromagnetic energy, electronic data, and combinations thereof, in accordance with FIGS. 1-16, and the present disclosure.

FIG. 19 is an example block diagram for a method 1000 of designing a system for wirelessly transferring one or more of electrical energy, electrical power, electromagnetic energy, and electronic data, in accordance with the systems, methods, and apparatus of the present disclosure. To that end, the method 1000 may be utilized to design a system in accordance with any disclosed embodiments of the system 10, 110 and any components thereof.

At block 1200, the method 1000 includes designing a wireless transmission system for use in the system 10, 110. The wireless transmission system designed at block 1200 may be designed in accordance with one or more of the aforementioned and disclosed embodiments of the wireless transmission system 20, 120, in whole or in part and, optionally, including any components thereof. Block 1200 may be implemented as a method 1200 for designing a wireless transmission system.

Figures 20, 21:
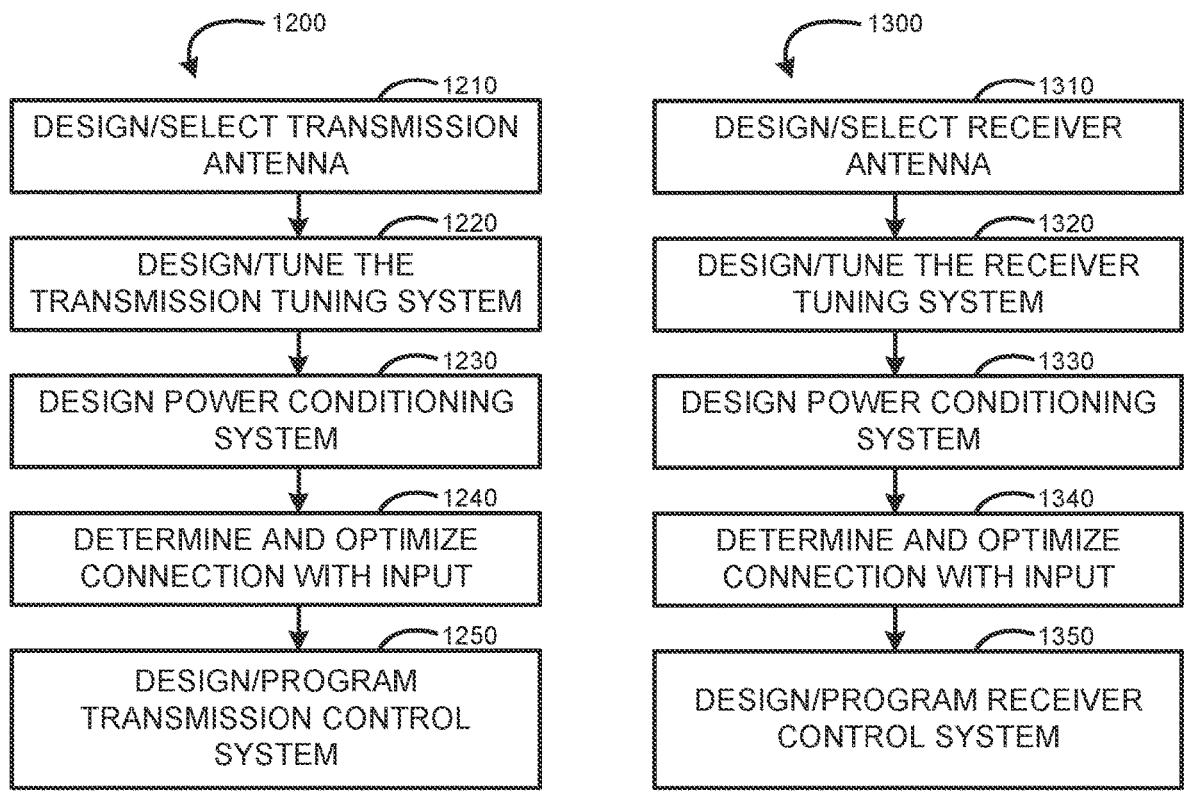
FIG. 20 is a flow chart for an exemplary method for designing a wireless transmission system for the system of FIG. 19, in accordance with FIGS. 1-19 and the present disclosure.
FIG. 21 is a flow chart for an exemplary method for designing a wireless receiver system for the system of FIG. 20, in accordance with FIGS. 1-19 and the present disclosure.

Turning now to FIG. 20 and with continued reference to the method 1000 of FIG. 18, an example block diagram for the method 1200 for designing a wireless transmission system is illustrated. The wireless transmission system designed by the method 1200 may be designed in accordance with one or more of the aforementioned and disclosed embodiments of the wireless transmission system 20, 120 in whole or in part and, optionally, including any components thereof. The method 1200 includes designing and/or selecting a transmission antenna for the wireless transmission system, as illustrated in block 1210. The designed and/or selected transmission antenna may be designed and/or selected in accordance with one or more of the aforementioned and disclosed embodiments of the transmission antenna 21, 121, 221, in whole or in part and including any components thereof. The method 1200 also includes designing and/or tuning a transmission tuning system for the wireless transmission system, as illustrated in block 1220. Such designing and/or tuning may be utilized for, but not limited to being utilized for, impedance matching, as discussed in more detail above. The designed and/or tuned transmission tuning system may be designed and/or tuned in accordance with one or more of the aforementioned and disclosed embodiments of wireless transmission system 20, 120, in whole or in part and, optionally, including any components thereof.

The method 1200 further includes designing a power conditioning system for the wireless transmission system 20, 120, as illustrated in block 1230. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, in whole or in part and, optionally, including any components thereof. Further, at block 1240, the method 1200 may involve determining and/or optimizing a connection, and any associated connection components, between the input power source 12 and the power conditioning system that is designed at block 1230. Such determining and/or optimizing may include selecting and implementing protection mechanisms and/or apparatus, selecting and/or implementing voltage protection mechanisms, among other things.

The method 1200 further includes designing and/or programing a transmission control system of the wireless transmission system of the method 1000, as illustrated in block 1250. The designed transmission control system may be designed in accordance with one or more of the aforementioned and disclosed embodiments of the transmission control system 26, in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 20, at block 1300, the method 1000 includes designing a wireless receiver system for use in the system 10, 110. The wireless transmission system designed at block 1300 may be designed in accordance with one or more of the aforementioned and disclosed embodiments of the wireless receiver system 30 in whole or in part and, optionally, including any components thereof. Block 1300 may be implemented as a method 1300 for designing a wireless receiver system.

Turning now to FIG. 21 and with continued reference to the method 1000 of FIG. 19, an example block diagram for the method 1300 for designing a wireless receiver system is illustrated. The wireless receiver system designed by the method 1300 may be designed in accordance with one or more of the aforementioned and disclosed embodiments of the wireless receiver system 30 in whole or in part and, optionally, including any components thereof. The method 1300 includes designing and/or selecting a receiver antenna for the wireless receiver system, as illustrated in block 1310. The designed and/or selected receiver antenna may be designed and/or selected in accordance with one or more of the aforementioned and disclosed embodiments of the receiver antenna 31, in whole or in part and including any components thereof. The method 1300 includes designing and/or tuning a receiver tuning system for the wireless receiver system, as illustrated in block 1320. Such designing and/or tuning may be utilized for, but not limited to being utilized for, impedance matching, as discussed in more detail above. The designed and/or tuned receiver tuning system may be designed and/or tuned in accordance with one or more of the aforementioned and disclosed embodiments of the receiver tuning and filtering system 34 in whole or in part and/or, optionally, including any components thereof.

The method 1300 further includes designing a power conditioning system for the wireless receiver system, as illustrated in block 1330. The power conditioning system may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 1340, the method 1300 may involve determining and/or optimizing a connection, and any associated connection components, between the load 16 and the power conditioning system of block 1330. Such determining may include selecting and implementing protection mechanisms and/or apparatus, selecting and/or implementing voltage protection mechanisms, among other things.

The method 1300 further includes designing and/or programing a receiver control system of the wireless receiver system of the method 1300, as illustrated in block 1350. The designed receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 1000 of FIG. 19, the method 1000 further includes, at block 1400, optimizing and/or tuning both the wireless transmission system and the wireless receiver system for wireless power transfer. Such optimizing and/or tuning includes, but is not limited to including, controlling and/or tuning parameters of system components to match impedance, optimize and/or set voltage and/or power levels of an output power signal, among other things and in accordance with any of the disclosed systems, methods, and apparatus herein. Further, the method 1000 includes optimizing and/or tuning one or both of the wireless transmission system and the wireless receiver system for data communications, in view of system characteristics necessary for wireless power transfer. Such optimizing and/or tuning includes, but is not limited to including, optimizing power characteristics for concurrent transmission of electrical power signals and electrical data signals, tuning quality factors of antennas for different transmission schemes, among other things and in accordance with any of the disclosed systems, methods, and apparatus herein.

Figure 22:
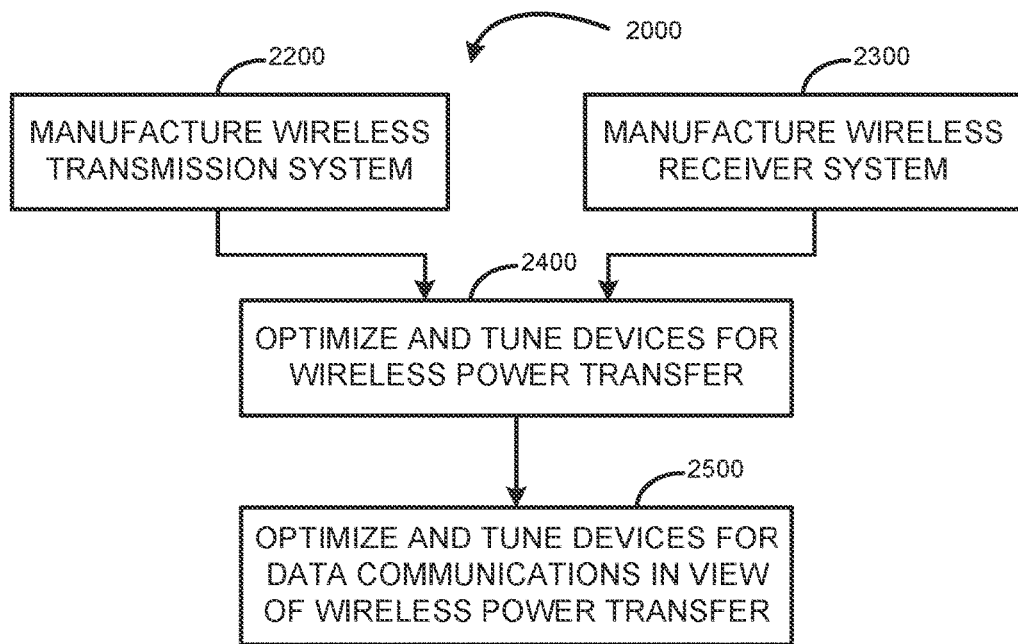
FIG. 22 is a flow chart for an exemplary method for manufacturing a system for wireless transmission of one or more of electrical energy, electrical power signals, electrical power, electrical electromagnetic energy, electronic data, and combinations thereof, in accordance with FIGS. 1-16, 21 and the present disclosure.

FIG. 22 is an example block diagram for a method 2000 for manufacturing a system for wirelessly transferring one or both of electrical power signals and electrical data signals, in accordance with the systems, methods, and apparatus of the present disclosure. To that end, the method 2000 may be utilized to manufacture a system in accordance with any disclosed embodiments of the system 10, 110 and any components thereof.

At block 2200, the method 2000 includes manufacturing a wireless transmission system for use in the system 10, 110. The wireless transmission system manufactured at block 2200 may be designed in accordance with one or more of the aforementioned and disclosed embodiments of the wireless transmission system 20, 120 in whole or in part and, optionally, including any components thereof. Block 2200 may be implemented as a method 2200 for manufacturing a wireless transmission system.

Figures 23, 24:
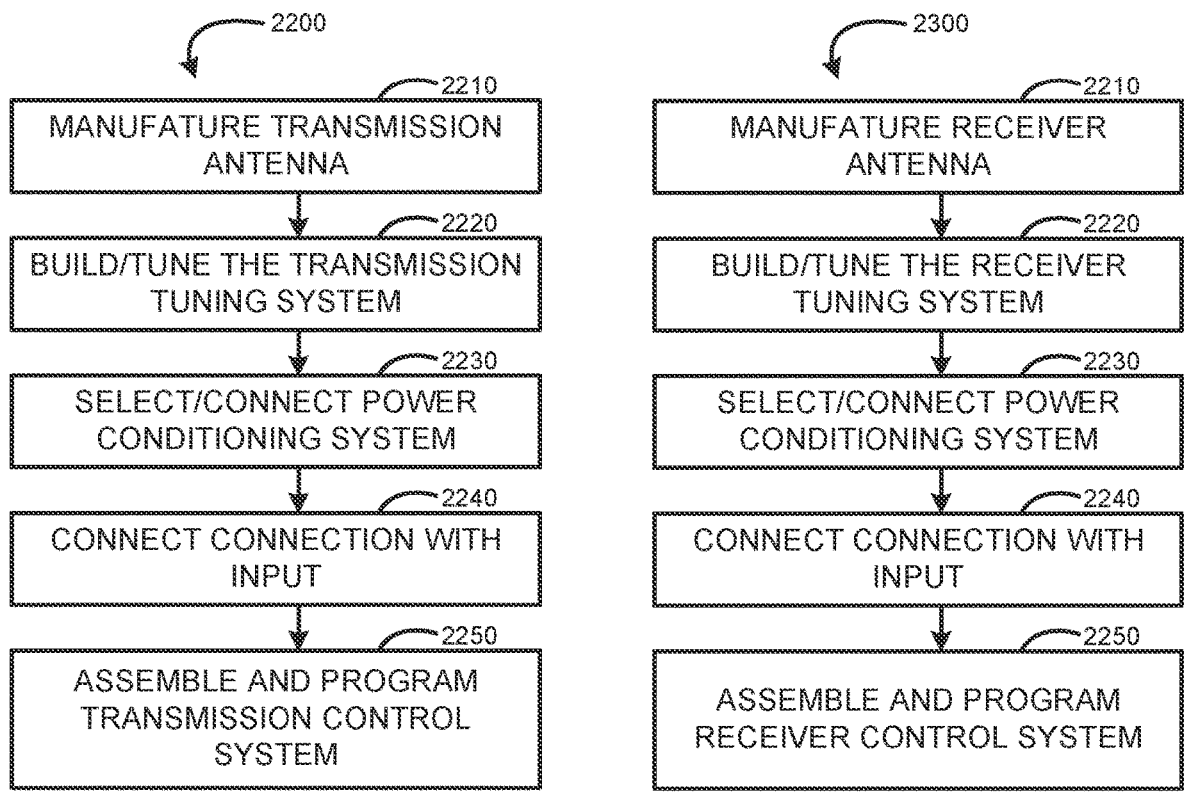
FIG. 23 is a flow chart for an exemplary method for manufacturing a wireless transmission system for the system of FIG. 22, in accordance with FIGS. 1-16, 22 and the present disclosure.
FIG. 24 is a flow chart for an exemplary method for designing a wireless receiver system for the system of FIG. 22, in accordance with FIGS. 1-16, 22, and the present disclosure.

Turning now to FIG. 23 and with continued reference to the method 2000 of FIG. 21, an example block diagram for the method 2200 for manufacturing a wireless transmission system is illustrated. The wireless transmission system manufactured by the method 2200 may be manufactured in accordance with one or more of the aforementioned and disclosed embodiments of the wireless transmission system 20, 120 in whole or in part and, optionally, including any components thereof. The method 2200 includes manufacturing a transmission antenna for the wireless transmission system, as illustrated in block 2210. The manufactured transmission system may be built and/or tuned in accordance with one or more of the aforementioned and disclosed embodiments of the transmission antenna 21, in whole or in part and including any components thereof. The method 2200 also includes building and/or tuning a transmission tuning system for the wireless transmission system, as illustrated in block 2220. Such building and/or tuning may be utilized for, but not limited to being utilized for, impedance matching, as discussed in more detail above. The built and/or tuned transmission tuning system may be designed and/or tuned in accordance with one or more of the aforementioned and disclosed embodiments of the transmission tuning system 24, in whole or in part and, optionally, including any components thereof.

The method 2200 further includes selecting and/or connecting a power conditioning system for the wireless transmission system, as illustrated in block 2230. The power conditioning system manufactured may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40 in whole or in part and, optionally, including any components thereof. Further, at block 2240, the method 2200 involve determining and/or optimizing a connection, and any associated connection components, between the input power source 12 and the power conditioning system of block 2230. Such determining may include selecting and implementing protection mechanisms and/or apparatus, selecting and/or implementing voltage protection mechanisms, among other things.

The method 2200 further includes assembling and/or programing a transmission control system of the wireless transmission system of the method 2000, as illustrated in block 2250. The assembled transmission control system may be assembled and/or programmed in accordance with one or more of the aforementioned and disclosed embodiments of the transmission control system 26 in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 22, at block 2300, the method 2000 includes manufacturing a wireless receiver system for use in the system 10. The wireless transmission system manufactured at block 2300 may be designed in accordance with one or more of the aforementioned and disclosed embodiments of the wireless receiver system 30 in whole or in part and, optionally, including any components thereof. Block 2300 may be implemented as a method 2300 for manufacturing a wireless receiver system.

Turning now to FIG. 24 and with continued reference to the method 2000 of FIG. 13, an example block diagram for the method 2300 for manufacturing a wireless receiver system is illustrated. The wireless receiver system manufactured by the method 2300 may be designed in accordance with one or more of the aforementioned and disclosed embodiments of the wireless receiver system 30 in whole or in part and, optionally, including any components thereof. The method 2300 includes manufacturing a receiver antenna for the wireless receiver system, as illustrated in block 2310. The manufactured receiver antenna may be manufactured, designed, and/or selected in accordance with one or more of the aforementioned and disclosed embodiments of the receiver antenna 31 in whole or in part and including any components thereof. The method 2300 includes building and/or tuning a receiver tuning system for the wireless receiver system, as illustrated in block 2320. Such building and/or tuning may be utilized for, but not limited to being utilized for, impedance matching, as discussed in more detail above. The built and/or tuned receiver tuning system may be designed and/or tuned in accordance with one or more of the aforementioned and disclosed embodiments of the receiver tuning and filtering system 34 in whole or in part and, optionally, including any components thereof.

The method 2300 further includes selecting and/or connecting a power conditioning system for the wireless receiver system, as illustrated in block 2330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 2340, the method 2300 may involve determining and/or optimizing a connection, and any associated connection components, between the load 16 and the power conditioning system of block 2330. Such determining may include selecting and implementing protection mechanisms and/or apparatus, selecting and/or implementing voltage protection mechanisms, among other things.

The method 2300 further includes assembling and/or programing a receiver control system of the wireless receiver system of the method 2300, as illustrated in block 2350. The assembled receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 2000 of FIG. 22, the method 2000 further includes, at block 2400, optimizing and/or tuning both the wireless transmission system and the wireless receiver system for wireless power transfer. Such optimizing and/or tuning includes, but is not limited to including, controlling and/or tuning parameters of system components to match impedance, optimize and/or configure voltage and/or power levels of an output power signal, among other things and in accordance with any of the disclosed systems, methods, and apparatus herein. Further, the method 2000 includes optimizing and/or tuning one or both of the wireless transmission system and the wireless receiver system for data communications, in view of system characteristics necessary for wireless power transfer, as illustrated at block 2500. Such optimizing and/or tuning includes, but is not limited to including, optimizing power characteristics for concurrent transmission of electrical power signals and electrical data signals, tuning quality factors of antennas for different transmission schemes, among other things and in accordance with any of the disclosed systems, methods, and apparatus herein.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10, 110 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A reconfigurable wireless power transfer system comprising:
    a first wireless transmission system, the first wireless transmission system configured to receive input power from an input power source and generate AC wireless signals based, at least in part, on the input power, the AC wireless signals including wireless power signals and wireless data signals, the first wireless transmission system comprising:
        a first transmission antenna including a first antenna portion having a first terminal and a second terminal and a second antenna portion having a third terminal and a fourth terminal, wherein the second terminal is in electrical connection with the third terminal, wherein both the first antenna portion and the second antenna portion are configured to couple with one or more other antennas;
        a first transmission controller configured to provide first driving signals for driving the first transmission antenna;
        a first power conditioning system configured to receive the first driving signals and generate the AC wireless signals based, at least in part, on the first driving signal; and
        a first transmission tuning system electrically connected to the first terminal and the fourth terminal of the first transmission antenna; and
    one or more secondary wireless transmission systems, each of the one or more secondary wireless transmission systems comprising:
        a secondary transmission antenna including a third antenna portion having a fifth terminal and a sixth terminal and a fourth antenna portion having a seventh terminal and an eighth terminal, wherein the sixth terminal is in electrical connection with the seventh terminal, wherein both the third antenna portion and the fourth antenna portion are configured to couple with one or more respective third or fourth antenna portions of another secondary transmission antenna, the first or second antenna portions of the first transmission antenna, one or more receiver antennas, or combinations thereof, wherein each of the one or more secondary wireless transmission systems is positionable in a first repeater position, a second repeater position, and a third repeater position;
        a secondary transmission tuning system electrically connected to the fifth terminal and the eighth terminal of the secondary transmission antenna;
        a repeater tuning system electrically connected to a node between the sixth terminal and the seventh terminal of the secondary transmission antenna, wherein the repeater tuning system is further electrically connected to the secondary transmission tuning system, and wherein the repeater tuning system is configured to isolate magnetic fields generated by the third antenna portion and the fourth antenna portion;
        wherein when the one or more secondary wireless transmission systems is in the first repeater position, the third antenna portion of the secondary transmission antenna is configured to receive the AC wireless signals from one of the first or second antenna portions of the first transmission antenna, or a respective fourth antenna portion of a first another secondary transmission antenna, and the fourth antenna portion of the secondary transmission antenna is configured to repeat the AC wireless signals to one of the one or more receiver antennas,
        wherein when the one or more secondary wireless transmission systems is in the second repeater position, the third antenna portion of the secondary transmission antenna is configured to receive the AC wireless signals from one of the first or second antenna portions of the first transmission antenna or the respective fourth antenna portion of the first another secondary transmission antenna, and the fourth antenna portion of the secondary transmission antenna is configured to repeat the AC wireless signals to a respective third antenna portion of a second another secondary transmission antenna, and both the third and fourth antenna portions of the secondary transmission antenna are further to configure to repeat the AC wireless signals to a respective one of the one or more receiver antennas, and
        wherein when the one or more secondary wireless transmission systems is in the third repeater position, the third antenna portion of the secondary transmission antenna is configured to receive the AC wireless signals from one of the first or second antenna portions of the first transmission antenna or the respective fourth antenna portion of the first another secondary transmission antenna, and the fourth antenna portion of the secondary transmission antenna is configured to repeat the AC wireless signals to the respective third antenna portion of the second another secondary transmission antenna; and at least one wireless receiver system configured to receive the AC wireless signals to provide electrical power to a load operatively associated with the at least one wireless receiver system, wherein each of the at least one wireless receiver system comprises one of the one or more receiver antennas, the one or more receiver antennas each configured to couple with one or more of the first transmission antenna, the one or more secondary transmission antenna, or combinations thereof, wherein the load is configured to provide electrical power to a computer peripheral.

2. The reconfigurable wireless power transfer system of claim 1, wherein the computer peripheral comprises one or more of a computer input device, a mouse, a keyboard, a mobile device, an audio device, a headset, headphones, earbuds, a remote control, a recording device, a conference telephonic device, a microphone, a gaming controller, a camera, a stylus, electronic eyewear, or combinations thereof.

3. The reconfigurable wireless power transfer system of claim 1, wherein the load is an electrical energy storage device of the computer peripheral, and wherein the at least one wireless receiver system is configured to power the computer peripheral without charging the electrical energy storage device.

4. The reconfigurable wireless power transfer system of claim 1, wherein one or more of the first wireless transmission system, the one or more secondary wireless transmission systems, or combinations thereof are configured to provide electrical power to the load operatively associated with the wireless receiver system, wherein the load is an electrical energy storage device of the computer peripheral.

5. The reconfigurable wireless power transfer system of claim 1, wherein the first transmission tuning system is configured to tune and filter the AC wireless signals to generate filtered AC wireless signals, and the secondary transmission tuning system is configured to further tune and filter the filtered AC wireless signals to generate twice-filtered AC wireless signals.

6. The reconfigurable wireless power transfer system of claim 1, further comprising a demodulation circuit configured to receive communications signals from a wireless receiver system and decode the communications signals by determining a rate of change in electrical characteristics of the communications signals.

7. The reconfigurable wireless power transfer system of claim 1, wherein the first wireless transmission system further includes a repeater tuning system configured to tune at least one of the first and second antenna portions of the first antenna to function as a repeater for the AC wireless signals.

8. The reconfigurable wireless power transfer system of claim 1, wherein the repeater tuning system is configured to tune the secondary transmission antenna such that the third antenna portion is configured to receive the AC wireless signals from one of the first or second antenna portions of the first transmission antenna and one or more of the third antenna portion, the fourth antenna portion, or combinations thereof are configured to repeat the AC wireless signals.

9. The reconfigurable wireless power transfer system of claim 1, wherein an operating frequency is 6.78 megahertz (MHz) for each of the first transmission antenna and the secondary transmission antenna.

10. A reconfigurable wireless power transfer system configured to operate at an operating frequency, the reconfigurable wireless power transfer system comprising:

a first wireless transmission system, the first wireless transmission system configured to receive input power from an input power source and generate AC wireless signals based, at least in part, on the input power, the AC wireless signals including wireless power signals and wireless data signals, the first wireless transmission system comprising:

a first transmission antenna including a first antenna portion having a first terminal and a second terminal and a second antenna portion having a third terminal and a fourth terminal, wherein the second terminal is in electrical connection with the third terminal, wherein both the first antenna portion and the second antenna portion are configured to couple with one or more other antennas and operate based on the operating frequency;

a first transmission controller configured to provide first driving signals for driving the first transmission antenna;

a first power conditioning system configured to receive the driving signals and generate the AC wireless signals based, at least in part, on the first driving signal; and a first transmission tuning system electrically connected to the first terminal and the fourth terminal of the first transmission antenna; and one or more secondary wireless transmission systems, each of the one or more secondary wireless transmission systems comprising:

a secondary transmission antenna including a third antenna portion having a fifth terminal and a sixth terminal and a fourth antenna portion having a seventh terminal and an eighth terminal, wherein the sixth terminal is in electrical connection with the seventh terminal, wherein both the third and fourth antenna portions of the secondary transmission antenna are configured to operate based on the operating frequency and couple with one or more respective third or fourth antenna portions of another secondary transmission antenna, one of the first or second antenna portions of the first transmission antenna, one or more receiver antennas, or combinations thereof;

a secondary transmission tuning system electrically connected to the fifth terminal and the eighth terminal of the secondary transmission antenna;

a repeater tuning system electrically connected to a node between the sixth terminal and the seventh terminal of the secondary transmission antenna, wherein the repeater tuning system is further electrically connected to the secondary transmission tuning system, and wherein the repeater tuning system is configured to isolate magnetic fields generated by the third antenna portion and the fourth antenna portion;

the one or more secondary wireless transmission systems configured to:
- receive the AC wireless signals from one or more of the first wireless transmission system, another secondary wireless transmission system, or combinations thereof, and
- repeat the AC wireless signals to one or more of the secondary transmission antennas, the one or more receiver antennas, or combinations thereof, and
- wherein each of the one or more secondary wireless transmission systems is positionable in a first repeater position, a second repeater position and a third repeater position,
- wherein when the one or more secondary wireless transmission systems is in the first repeater position, the third antenna portion of the secondary transmission antenna is configured to receive the AC wireless signals from one of the first or second antenna portions of the first transmission antenna, or a respective fourth antenna portion of a first another secondary transmission antenna, and the fourth antenna portion of the secondary transmission antenna is configured to repeat the AC wireless signals to one of the one or more receiver antennas,
- wherein when the one or more secondary wireless transmission systems is in the second repeater position, the third antenna portion of the secondary transmission antenna is configured to receive the AC wireless signals from one of the first or second antenna portions of the first transmission antenna or the respective fourth antenna portion of the first another secondary transmission antenna, and the fourth antenna portion of the secondary transmission antenna is configured to repeat the AC wireless signals to a respective third antenna portion of a second another secondary transmission antenna, and both the third and fourth antenna portions of the secondary transmission antenna are further to configure to repeat the AC wireless signals to a respective one of the one or more receiver antennas,
- wherein when the one or more secondary wireless transmission systems is in the third repeater position, the third antenna portion of the secondary transmission antenna is configured to receive the AC wireless signals from one of the first or second antenna portions of the first transmission antenna or the respective fourth antenna portion of the first another secondary transmission antenna, and the fourth antenna portion of the secondary transmission antenna is configured to repeat the AC wireless signals to the respective third antenna portion of the second another secondary transmission antenna; and a wireless receiver system, the wireless receiver system configured to receive the AC wireless signals to provide electrical power to a load operatively associated with the wireless receiver system, the wireless receiver system including one of the one or more receiver antennas, the one or more receiver antennas each configured to operate at the operating frequency and couple with one or more of the first wireless transmission system, the one or more secondary wireless transmission systems, or combinations thereof, wherein the load is configured to provide electrical power to a computer peripheral.

* * * * *